United States Patent
Porsch et al.

(10) Patent No.: US 8,394,909 B2
(45) Date of Patent: Mar. 12, 2013

(54) SILANE-TERMINATED POLYURETHANES WITH HIGH STRENGTH AND HIGH ELONGATION

(75) Inventors: Michael J. Porsch, Minneapolis, MN (US); Kelly A. Kuznia Freudenberg, Burnsville, MN (US)

(73) Assignee: Construction Research & Technology GmbH, Trostberg (DE)

( * ) Notice: Subject to any disclaimer, the term of this patent is extended or adjusted under 35 U.S.C. 154(b) by 274 days.

(21) Appl. No.: 12/345,041

(22) Filed: Dec. 29, 2008

(65) Prior Publication Data

US 2009/0227710 A1 Sep. 10, 2009

Related U.S. Application Data

(63) Continuation of application No. 10/808,084, filed on Mar. 24, 2004, now Pat. No. 7,482,420.

(51) Int. Cl.
*C08G 18/38* (2006.01)
*C08G 18/10* (2006.01)
*C08G 18/42* (2006.01)
*C08G 18/48* (2006.01)

(52) U.S. Cl. .............. 528/28; 528/30; 528/33; 528/38

(58) Field of Classification Search .............. 528/28, 528/33, 38, 30
See application file for complete search history.

(56) References Cited

U.S. PATENT DOCUMENTS

| | | |
|---|---|---|
| 3,627,722 A | 12/1971 | Seiter |
| 3,632,557 A | 1/1972 | Brode et al. |
| 3,801,421 A | 4/1974 | Allen et al. |
| 3,937,861 A | 2/1976 | Zuckerman et al. |
| 3,979,344 A | 9/1976 | Bryant et al. |
| 4,345,053 A | 8/1982 | Rizk et al. |
| 4,374,237 A | 2/1983 | Berger et al. |
| 4,567,228 A | 1/1986 | Gaa et al. |
| 4,625,012 A | 11/1986 | Rizk et al. |
| 4,645,816 A | 2/1987 | Pohl et al. |
| 4,687,533 A | 8/1987 | Rizk et al. |
| 4,798,878 A | 1/1989 | Brinkmann |
| 4,897,302 A | 1/1990 | Bull |
| 5,068,304 A | 11/1991 | Higuchi et al. |
| 5,227,434 A | 7/1993 | Katz |
| 5,298,572 A | 3/1994 | Katz |
| 5,364,955 A | 11/1994 | Zwiener et al. |
| 5,432,246 A | 7/1995 | Fenn et al. |
| 5,539,045 A | 7/1996 | Potts et al. |
| 5,554,709 A | 9/1996 | Emmerling et al. |
| 5,749,787 A | 5/1998 | Jank |
| 5,756,751 A | 5/1998 | Schmalstieg et al. |
| 5,760,155 A | 6/1998 | Mowrer et al. |
| 5,866,651 A | 2/1999 | Moren et al. |
| 5,908,948 A | 6/1999 | Roesler et al. |
| 5,990,257 A | 11/1999 | Johnston et al. |
| 6,001,946 A | 12/1999 | Waldman et al. |
| 6,005,047 A | 12/1999 | Shaffer et al. |
| 6,040,028 A | 3/2000 | Cline et al. |
| 6,046,270 A | 4/2000 | Roesler et al. |
| 6,077,902 A | 6/2000 | Roesler et al. |
| 6,159,550 A | 12/2000 | Daluise |
| 6,162,938 A | 12/2000 | Hansen et al. |
| 6,197,912 B1 | 3/2001 | Huang et al. |
| 6,207,766 B1 | 3/2001 | Doi et al. |
| 6,255,434 B1 | 7/2001 | McGraw et al. |
| 6,265,517 B1 | 7/2001 | Stuart |
| 6,271,333 B1 | 8/2001 | Okuhira |
| 6,281,322 B1 | 8/2001 | Groth et al. |
| 6,310,170 B1 | 10/2001 | Johnston et al. |
| 6,362,140 B1 | 3/2002 | McGraw et al. |
| 6,416,847 B1 | 7/2002 | Lein et al. |
| 6,420,320 B1 | 7/2002 | McGraw et al. |
| 6,423,661 B1 | 7/2002 | McGraw et al. |
| 6,432,865 B1 | 8/2002 | McGraw et al. |
| 6,440,541 B1 | 8/2002 | Humphrey et al. |
| 6,440,573 B1 | 8/2002 | Hansen et al. |
| 6,448,216 B1 | 9/2002 | Wolf et al. |
| 6,448,362 B1 | 9/2002 | McGraw et al. |
| 6,498,210 B1 | 12/2002 | Wang et al. |
| 6,509,433 B2 | 1/2003 | Koenig et al. |
| 6,512,033 B1 | 1/2003 | Wu |
| 6,545,087 B1 | 4/2003 | Schmalstieg et al. |
| 6,599,354 B1 | 7/2003 | Schmalstieg et al. |
| 6,602,964 B2 | 8/2003 | Huang et al. |
| 6,613,816 B2 | 9/2003 | Mahdi et al. |
| 6,626,988 B1 | 9/2003 | Schmalstieg et al. |
| 6,762,270 B2 | 7/2004 | Ludewig et al. |
| 6,884,852 B1 | 4/2005 | Klauck et al. |
| 6,989,429 B2 | 1/2006 | Feng |
| 7,094,859 B2 | 8/2006 | Schindler et al. |
| 7,482,420 B2 * | 1/2009 | Porsch et al. .................. 528/28 |
| 2002/0004553 A1 | 1/2002 | Temme et al. |
| 2002/0115811 A1 | 8/2002 | Huang et al. |
| 2002/0188068 A1 | 12/2002 | Mack et al. |
| 2003/0153712 A1 | 8/2003 | Ludewig et al. |
| 2003/0232949 A1 | 12/2003 | Roesler et al. |
| 2004/0072921 A1 | 4/2004 | Stanjek et al. |
| 2004/0087752 A1 | 5/2004 | Schindler et al. |
| 2004/0181025 A1 | 9/2004 | Schindler et al. |
| 2006/0173140 A1 | 8/2006 | Roesler et al. |

FOREIGN PATENT DOCUMENTS

| | | |
|---|---|---|
| EP | 158893 A1 | 10/1985 |
| EP | 676403 B1 | 10/1995 |
| WO | WO 98/18843 | 5/1998 |

OTHER PUBLICATIONS

Feng, Ta-Min, and Waldman, Bruce A:, Silylated Urethane Polymers Enhance Properties of Construction Sealants, Adhesives Age, Apr. 1995, pp. 30-32, USA.

* cited by examiner

*Primary Examiner* — Rabon Sergent
(74) *Attorney, Agent, or Firm* — Curatolo Sidoti Co., LPA; Joseph G. Curatolo; Salvatore A. Sidoti

(57) ABSTRACT

A silane-terminated polyurethane composition is the reaction product of a silane-terminated polyurethane prepolymer component, a silane-terminated monomeric diisocyanate, and optionally at least one multifunctional trisilane or tetrasilane component. A method for making a composition includes (a) providing a silane-terminated polyurethane prepolymer component, a silane-terminated monomeric diisocyanate component, and optionally at least one multifunctional trisilane or tetrasilane component, and (b) combining the prepolymer component, monomeric component, and optional multifunctional silane component to form a silane-terminated polyurethane reaction product with a tensile strength of about 4 MPa or greater and an elongation of about 200% or greater.

30 Claims, 4 Drawing Sheets

SILANE-TERMINATED POLYURETHANES WITH HIGH STRENGTH AND HIGH ELONGATION

CROSS REFERENCE TO RELATED APPLICATIONS

This application is a continuation of U.S. Ser. No. 10/808,084 filed on Mar. 24, 2004, now U.S. Pat. No. 7,482,420.

BACKGROUND

Polyurethane materials demonstrate a unique combination of performance properties, including excellent abrasion resistance, flexibility, hardness, chemical resistance, solvent resistance, light stability, and weatherability.

The performance properties of polyurethanes make them suitable for many useful products, including coatings, adhesives, sealants, and compositions. Standard polyurethanes, however, have disadvantages related to the presence of isocyanates, such as sensitivity to humid application conditions. Silane-terminated polyurethanes can be formulated to be isocyanate-free, but have not previously demonstrated the high tensile strength and high elongation properties required for high performance applications.

What is needed in the art are polyurethane materials that are not sensitive to humid application conditions. What is also needed in the art is a high performance silane-terminated polyurethane that is isocyanate-free and has both high strength and high elongation. These properties are met with the reaction product of a silane-terminated polyurethane prepolymer and a silane-terminated monomeric diisocyanate.

SUMMARY

A silane-terminated polyurethane composition is provided, comprising the reaction product of a silane-terminated polyurethane prepolymer component, a silane-terminated monomeric diisocyanate component, and optionally a trisilane or tetrasilane component.

In certain embodiments of the silane-terminated polyurethane composition:

a) the silane-terminated polyurethane prepolymer component comprises at least one of:
  i) a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

$R\text{—}NH\text{—}A^1\text{—}Si(R^1)_x(OR^2)_{3-x}$ or a mercaptosilane endcapper of the formula:

$HS\text{—}A^1\text{—}Si(R^1)_x(OR^2)_{3-x}$ wherein R represents a $C_1$ to $C_{10}$ alkyl group, a group having the formula $\text{—}A^1\text{—}Si(R^1)_x(OR^2)_{3-x}$, or a group having the formula $\text{—}CH(COOR^3)\text{—}CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; or
  ii) a prepolymer reaction product of at least one diisocyanate and at least one polyol with a mole ratio of isocyanate groups to hydroxy groups of about 0.5:1 to about 0.9:1, said prepolymer reaction product terminated with an isocyanatosilane endcapper of the formula:

$OCN\text{—}A^2\text{—}Si(R^1)_x(OR^2)_{3-x}$ wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1;

b) the silane-terminated monomeric diisocyanate component comprises at least one monomeric diisocyanate fully reacted with an aminosilane endcapper of the formula:

$R\text{—}NH\text{—}A^1\text{—}Si(R^1)_x(OR^2)_{3-x}$ or a mercaptosilane endcapper of the formula:

$HS\text{—}A^1\text{—}Si(R^1)_x(OR^2)_{3-x}$ wherein R represents a $C_1$ to $C_{10}$ alkyl group, a group having the formula $\text{—}A^1\text{—}Si(R^1)_x(OR^2)_{3-x}$, or a group having the formula $\text{—}CH(COOR^3)\text{—}CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and c) the optional trisilane or tetrasilane component comprises at least one of a polyether trisilane component, a polyether tetrasilane component, or a low molecular weight silane adduct comprising at least one of a trisilane adduct or a tetrasilane adduct.

A multicomponent formulation is provided comprising:

a) at least one of:
  i) a silane-terminated polyurethane prepolymer component comprising a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

$R\text{—}NH\text{—}A^1\text{—}Si(R^1)_x(OR^2)_{3-x}$ or a mercaptosilane endcapper of the formula:

$HS\text{—}A^1\text{—}Si(R^1)_x(OR^2)_{3-x}$ wherein R represents a $C_1$ to $C_{10}$ alkyl group, a group having the formula $\text{—}A^1\text{—}Si(R^1)_x(OR^2)_{3-x}$, or a group having the formula $\text{—}CH(COOR^3)\text{—}CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; or
  ii) a silane-terminated polyurethane prepolymer component comprising a prepolymer reaction product of at least one diisocyanate and at least one polyol with a mole ratio of isocyanate groups to hydroxy groups of about 0.5:1 to about 0.9:1, said prepolymer reaction product terminated with an isocyanatosilane endcapper of the formula:

$OCN\text{—}A^2\text{—}Si(R^1)_x(OR^2)_{3-x}$ wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1;

b) at least one monomeric diisocyanate fully reacted with an aminosilane endcapper of the formula:

$R\text{—}NH\text{—}A^1\text{—}Si(R^1)_x(OR^2)_{3-x}$ or a mercaptosilane endcapper of the formula:

$HS\text{—}A^1\text{—}Si(R^1)_x(OR^2)_{3-x}$ wherein R represents a $C_1$ to $C_{10}$ alkyl group, a group having the formula —$A^1$—Si($R^1$)$_x$(O$R^2$)$_{3-x}$, or a group having the formula —CH(COO$R^3$)—CH$_2$(COO$R^4$); $A^1$ represents a $C_1$ to $C_{10}$ linear, branched or cyclic alkylene group; $R^1$ represents a CH$_3$ or C$_2$H$_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and c) optionally at least one of a polyether trisilane component, a polyether tetrasilane component, or a low molecular weight silane adduct comprising at least one of a trisilane adduct or a tetrasilane adduct;

wherein when components a, b, and optionally c are combined, a silane-terminated polyurethane reaction product is formed that has a tensile strength of about 4 MPa or greater and an elongation of about 200% or greater.

A method for making a silane-terminated polyurethane composition is provided comprising:

a) providing a prepolymer component, a monomeric component, and optionally at least one multifunctional component, wherein the prepolymer component comprises a silane-terminated polyurethane prepolymer, the monomeric component comprises a silane-terminated monomeric diisocyanate, and the optional multifunctional component comprises at least one of a trisilane or tetrasilane component; and b) combining the prepolymer component, the monomeric component, and optionally the at least one multifunctional component to form a silane-terminated polyurethane reaction product;

wherein the silane-terminated polyurethane reaction product has a tensile strength of about 4 MPa or greater and an elongation of about 200% or greater.

DETAILED DESCRIPTION

Figure 1:
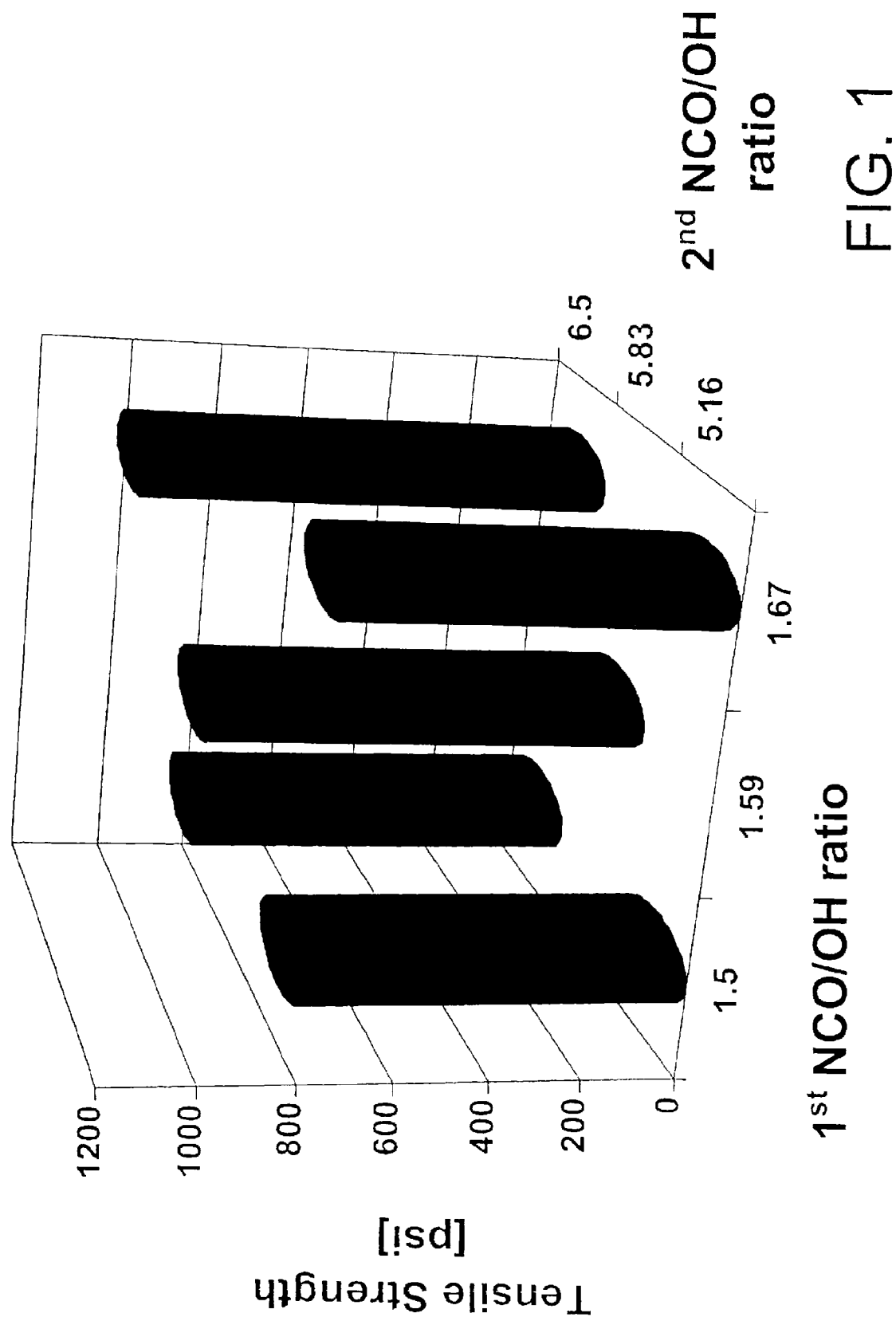
FIG. 1 is a three dimensional representation of tensile strength of certain silane-terminated polyurethane reaction products synthesized from isocyanate terminated prepolymers of disocyanate and polyol having a ratio of isocyanate groups to hydroxy groups less than 2:1, blended with monomeric disocyanates to increase the ratio above 2:1.

A silane-terminated polyurethane composition comprises the reaction product of a silane-terminated polyurethane prepolymer component, a silane-terminated monomeric diisocyanate component, and optionally a trisilane or tetrasilane component.

The silane-terminated polyurethane composition may also comprise the reaction product of a silane-terminated polyurethane prepolymer component, at least one monomeric diisocyanate fully reacted with an aminosilane endcapper or a mercaptosilane endcapper, and optionally at least one multifunctional component selected from the group consisting of a polyether trisilane component, a polyether tetrasilane component, or a low molecular weight silane adduct comprising at least one of a trisilane adduct or a tetrasilane adduct.

In certain embodiments, the silane-terminated polyurethane prepolymer component comprises a prepolymer reaction product of at least one diisocyanate and at least one polyol with a mole ratio of isocyanate groups to hydroxy groups of about 1.1:1 to about 2:1, wherein the prepolymer reaction product is terminated with an aminosilane endcapper of the formula: R—NH—$A^1$—Si($R^1$)$_x$(O$R^2$)$_{3-x}$, or a mercaptosilane endcapper of the formula: HS—$A^1$—Si($R^1$)$_x$(O$R^2$)$_{3-x}$, wherein R represents a $C_1$ to $C_{10}$ alkyl group, a group having the formula —$A^1$—Si($R^1$)$_x$(O$R^2$)$_{3-x}$, or a group having the formula —CH(COO$R^3$)—CH$_2$(COO$R^4$); $A^1$ represents a $C_1$ to $C_{10}$ linear, branched or cyclic alkylene group; $R^1$ represents a CH$_3$ or C$_2$H$_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

In other embodiments, the silane-terminated polyurethane prepolymer component comprises a prepolymer reaction product of at least one diisocyanate and at least one polyol with a mole ratio of isocyanate groups to hydroxy groups of about 0.5:1 to about 0.9:1, wherein the prepolymer reaction product is terminated with an isocyanatosilane endcapper of the formula: OCN—$A^2$—Si($R^1$)$_x$(O$R^2$)$_{3-x}$ wherein $A^2$ represents a $C_1$ to $C_6$ linear or branched alkylene group; $R^1$ represents a CH$_3$ or C$_2$H$_5$ group; $R^2$ represents a $C_1$ to $C_4$ alkyl group; and x is 0 or 1. The silane-terminated polyurethane prepolymer component may also comprise the above prepolymer reaction products terminated with a combination of aminosilane, mercaptosilane, and isocyanatosilane endcappers.

Generally, isocyanatosilanes are used to endcap hydroxy-terminated prepolymers (i.e., having a mole ratio of isocyanate groups to hydroxy groups (NCO/OH ratios) less than 1.0), and aminosilanes or mercaptosilanes are used to endcap NCO-terminated prepolymers (i.e., NCO/OH ratios greater than 1.0) and the diisocyanates.

The silane-terminated polyurethane composition may further comprise the reaction product of the silane-terminated polyurethane prepolymer component and at least one monomeric diisocyanate fully reacted with an aminosilane endcapper of the formula: R—NH—$A^1$—Si($R^1$)$_x$(O$R^2$)$_{3-x}$, or a mercaptosilane endcapper of the formula: HS—$A^1$—Si($R^1$)$_x$(O$R^2$)$_{3-x}$, wherein R represents a $C_1$ to $C_{10}$ alkyl group, a group having the formula —$A^1$—Si($R^1$)$_x$(O$R^2$)$_{3-x}$, or a group having the formula —CH(COO$R^3$)—CH$_2$(COO$R^4$); $A^1$ represents a $C_1$ to $C_{10}$ linear, branched or cyclic alkylene group; $R^1$ represents a CH$_3$ or C$_2$H$_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

In certain embodiments, the silane-terminated polyurethane composition comprises the reaction product of about 70 to about 95 percent by weight silane-terminated polyurethane prepolymer and about 5 to about 30 percent by weight silane-terminated monomeric diisocyanate, optionally including up to about 30 percent by weight trisilane or tetrasilane component, discussed in more detail below.

The performance capabilities of the composition can be expressed in terms of measured physical properties such as tensile strength and elongation percentage measured by a standard test method such as ASTM D 412. Tensile strength is the force needed to stretch a material until it breaks. Elongation percentage or elongation at break is how much the material stretches before it breaks, as a percentage of its original dimensions.

The polyol of the silane-terminated polyurethane prepolymer component may comprise a diol or higher functionality polyol, and may be selected from the group consisting of polyether polyols, polyester polyols, and combinations thereof.

For illustration purposes but not by way of limitation, the polyol may be selected from the group consisting of polypropylene glycols, polytetramethylene glycols, polyoxyalkylene diols and triols, polycaprolactone diols and triols, and combinations thereof.

Polyoxyalkylene polyols include polyethers prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, and mixtures of these aliphatic polyols. Representative polyoxyalkylene polyols include the described polyethers, polyethylene glycols, polypropylene glycols, polytetramethylene glycols, and mixtures thereof.

Representative examples of polyols include Voranol™ 220-028 and Voranol™ 220-056N (available from Dow Chemical Company, Midland, Mich.) as well as Acclaim™ 4200, Acclaim™ 6300, Acclaim™ 8200 and Acclaim™ 12200 (available from Bayer Corporation, Pittsburgh, Pa.).

In certain embodiments, the polyol of the silane-terminated polyurethane prepolymer component has a molecular weight in the range of about 500 to about 20000. In other embodiments, the polyol has a molecular weight in the range of about 4000 to about 12000. In another embodiment, the polyol comprises a polypropylene glycol with a number average molecular weight in the range of about 4000 to about 12000, and the polypropylene glycol has a degree of unsaturation of less than about 0.04 meq/g. The molecular weight is either a calculated molecular weight, i.e. the sum of the atomic weights of the atoms making up the material, or the molecular weight is a number average molecular weight determined based on end group analysis or measurement of colligative properties by ebulliometry, cryoscopy, or membrane osmometry.

For illustration purposes but not by way of limitation, each diisocyanate reactant may be selected from the group consisting of hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof. In one embodiment, the diisocyanate comprises a blend of 4,4'-diphenylmethane diisocyanate (MDI) with 2,4'-diphenylmethane diisocyanate (such as Mondur ML diisocyanate available from Bayer Corporation, Pittsburgh, Pa.).

The aminosilane endcapper for polyurethane prepolymers and monomeric diisocyanates may be selected from the group consisting of secondary aminosilanes having two methoxy groups, secondary aminosilanes having three methoxy groups, secondary aminosilanes having two ethoxy groups, secondary aminosilanes having three ethoxy groups, and combinations thereof. In certain embodiments, the aminosilane endcapper is selected from the group consisting of bis(trimethoxysilylpropyl)amine, 3-ethylamino-2-methylpropyltrimethoxysilane, N-(n-butyl)-3-aminopropyltrimethoxysilane, and combinations thereof.

A mercaptosilane endcapper for polyurethane prepolymers and monomeric diisocyanates may include, but need not be limited to, (3-mercaptopropyl)trimethoxysilane.

The isocyanatosilane endcapper for polyurethane prepolymers may be selected from the group consisting of isocyanatosilanes having two methoxy groups, isocyanatosilanes having three methoxy groups, isocyanatosilanes having two ethoxy groups, isocyanatosilanes having three ethoxy groups, and combinations thereof. In one embodiment, the isocyanatosilane endcapper comprises 3-isocyanatopropyl-trimethoxysilane.

In certain embodiments, the polyether trisilane component may comprise the reaction product of at least one polyether triol terminated with an isocyanatosilane endcapper of the formula: $OCN-A^2-Si(R^1)_x(OR^2)_{3-x}$ wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1. In other embodiments, the polyether trisilane component may comprise the multifunctional reaction product of at least one polyether triol terminated with at least one diisocyanate with a mole ratio of isocyanate groups to hydroxy groups of about 1.5:1 to about 2:1, wherein the multifunctional reaction product is terminated with an aminosilane endcapper of the formula: $R-NH-A^1-Si(R^1)_x(OR^2)_{3-x}$, or a mercaptosilane endcapper of the formula: $HS-A^1-Si(R^1)_x(OR^2)_{3-x}$, wherein R represents a $C_1$ to $C_{10}$ alkyl group, a group having the formula $-A^1-Si(R^1)_x(OR^2)_{3-x}$, or a group having the formula $-CH(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

A representative reaction of a polyether triol with an isocyanato endcapper to form a polyether trisilane is shown in Formula 1.

Formula 1. Synthesis of Polyether Trisilane

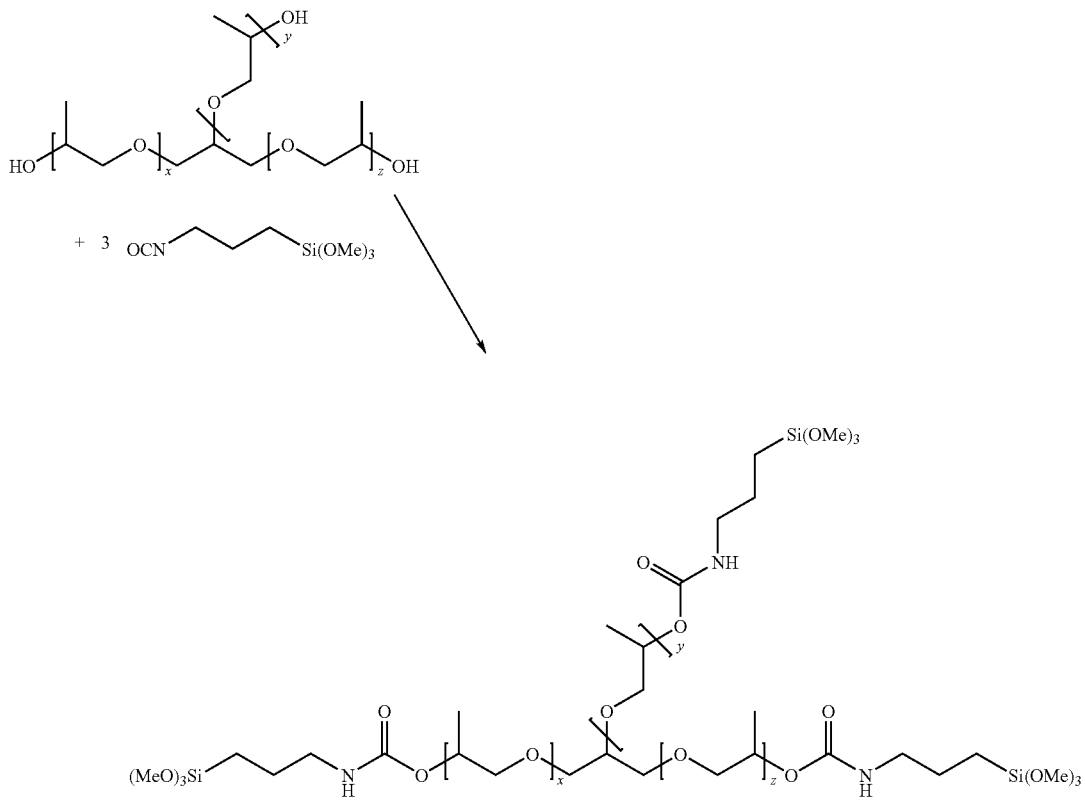

The polyether tetrasilane component may comprise the reaction product of at least one polyether tetraol terminated with an isocyanatosilane endcapper of the formula: OCN—$A^2$—Si($R^1$)$_x$(OR$^2$)$_{3-x}$ wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1. In certain embodiments, the polyether tetrasilane component may comprise the multifunctional reaction product of at least one polyether tetraol terminated with at least one diisocyanate with a mole ratio of isocyanate groups to hydroxy groups of about 1.5:1 to about 2:1, wherein the multifunctional reaction product is terminated with an aminosilane endcapper of the formula: R—NH—$A^1$—Si($R^1$)$_x$(OR$^2$)$_{3-x}$, or a mercaptosilane endcapper of the formula: HS—$A^1$—Si($R^1$)$_x$(OR$^2$)$_{3-x}$, wherein R represents a $C_1$ to $C_{10}$ alkyl group, a group having the formula —$A^1$—Si($R^1$)$_x$(OR$^2$)$_{3-x}$, or a group having the formula —CH(COOR$^3$)—CH$_2$(COOR$^4$); $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

The low molecular weight silane adduct may comprise the reaction product of at least one of the following sets of reactants:

a) i) at least one of HS—$A^1$—Si($R^1$)$_x$(OR$^2$)$_{3-x}$, or $R^7$—NH—$A^1$—Si($R^1$)$_x$(OR$^2$)$_{3-x}$, and ii) at least one of:

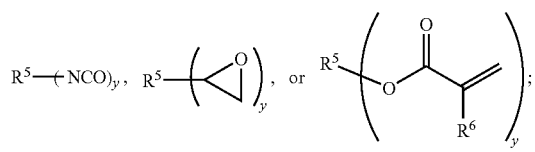

b) $R^5$—(—OH)$_y$ and OCN—$A^2$—Si($R^1$)$_x$(OR$^2$)$_{3-x}$;

c) i) at least one of:
$R^5$—(—NHR$^7$)$_y$, or
[(R$^2$O)$_{3-x}$(R$^1$)$_x$Si—$A^1$—]$_2$NH, and ii) at least one of:

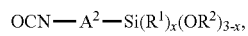

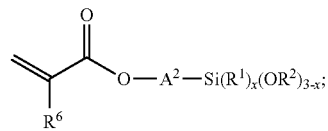

d) i) $[(R^2O)_{3-x}(R^1)_xSi-A^1-]_2NH$, and
   ii) a diisocyanate;
e) i) a polyether triamine and ii) at least one of

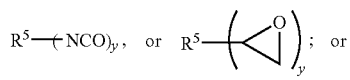
; or f) at least one of:
   i) diethylenetriamine or triethylenetetramine, and ii) at least one of:

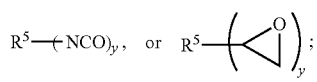
;

wherein $A^2$ represents a $C_1$ to $C_6$ linear, or branched alkylene group; $A^3$ represents a $C_1$ to $C_{10}$ linear, branched or cyclic alkylene group optionally interrupted with one or more ether oxygen atoms; $R^5$ represents a branched aliphatic hydrocarbon residue, a branched aliphatic ether residue, or an alkyl-substituted isocyanurate residue; $R^6$ represents H or a $CH_3$ group; $R^7$ represents H, a $C_1$ to $C_{10}$ alkyl group, a group having the formula $-A^1-Si(R^1)_x(OR^2)_{3-x}$, or a group having the formula $-CH(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; x is 0 or 1; and y is 3 or 4.

Examples of $R^5$ containing molecules include, but are not limited to, the structures set forth below.

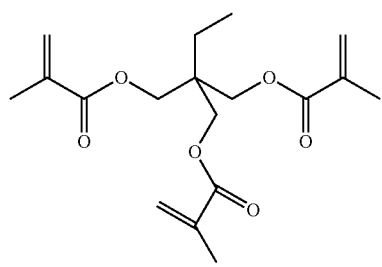

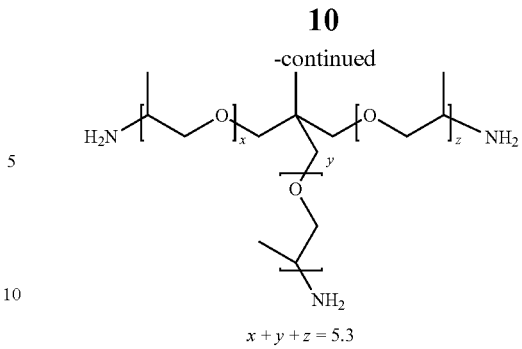

$x + y + z = 5.3$

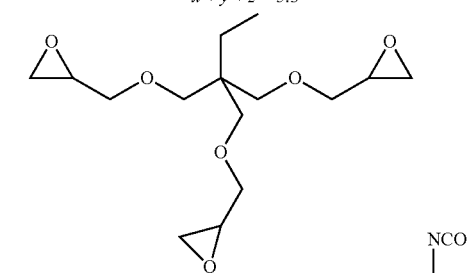

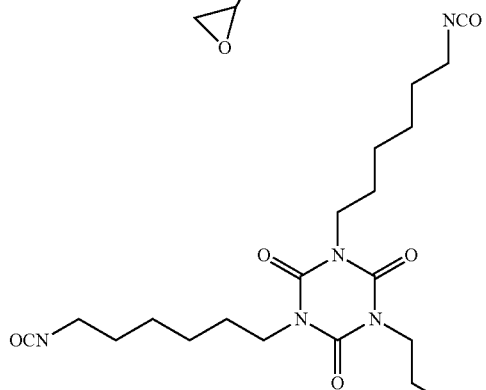

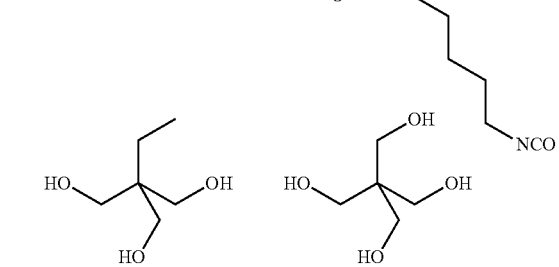

Representative reactions for the synthesis of low molecular weight trisilanes are shown in Formula 2.

Formula 2. Synthesis of Low Molecular Weight Trisilanes

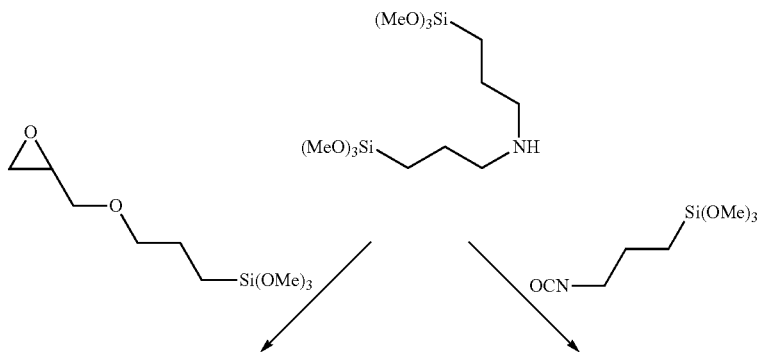

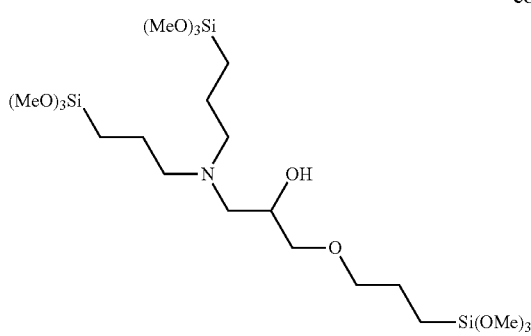
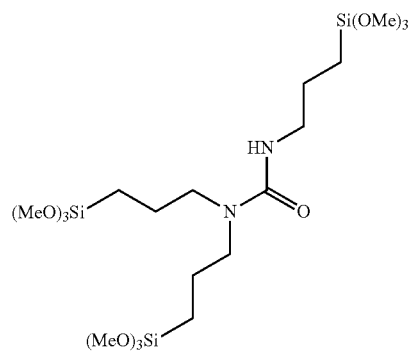

In certain embodiments, the silane-terminated polyurethane composition comprises the reaction product of about 40 to about 98 percent by weight silane-terminated polyurethane prepolymer, about 2 to about 40 percent by weight silane-terminated monomeric diisocyanate, and optionally up to about 30 percent by weight trisilane or tetrasilane component. In other embodiments, the silane-terminated polyurethane composition comprises the reaction product of about 65 to about 85 percent by weight silane-terminated polyurethane prepolymer, about 10 to about 25 percent by weight silane-terminated monomeric diisocyanate, and optionally up to about 10 percent by weight trisilane or tetrasilane component. The silane-terminated polyurethane compositions exhibit high tensile strengths and high elongation values, and are suitable for high performance applications.

Polyurethane compositions may be supplied to the trade as multicomponent (i.e., separately packaged) formulations. Accordingly, a multicomponent formulation may comprise:
(a) at least one of:
(i) a silane-terminated polyurethane prepolymer component comprising a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula: $R-NH-A^1-Si(R^1)_x(OR^2)_{3-x}$, or a mercaptosilane endcapper of the formula: $HS-A^1-Si(R^1)_x(OR^2)_{3-x}$, wherein R represents a $C_1$ to $C_{10}$ alkyl group, a group having the formula $-A^1-Si(R^1)_x(OR^2)_{3-x}$, or a group having the formula $-CH(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; or
(ii) a silane-terminated polyurethane prepolymer component comprising a prepolymer reaction product of at least one diisocyanate and at least one polyol with a mole ratio of isocyanate groups to hydroxy groups of about 0.5:1 to about 0.9:1, said prepolymer reaction product terminated with an isocyanatosilane endcapper of the formula: $OCN-A^2-Si(R^1)_x(OR^2)_{3-x}$ wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1;
(b) at least one monomeric diisocyanate fully reacted with an aminosilane endcapper of the formula: $R-NH-A^1-Si(R^1)_x(OR^2)_{3-x}$, or a mercaptosilane endcapper of the formula: $HS-A^1-Si(R^1)_x(OR^2)_{3-x}$, wherein R represents a $C_1$ to $C_{10}$ alkyl group, a group having the formula $-A^1-Si(R^1)_x(OR^2)_{3-x}$, or a group having the formula $-CHI(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and
(c) optionally at least one of a polyether trisilane component, a polyether tetrasilane component, or a low molecular weight silane adduct comprising at least one of a trisilane adduct or a tetrasilane adduct;
wherein when components a, b, and optionally c are combined, a silane-terminated polyurethane reaction product is formed that has a tensile strength of about 4 MPa or greater and an elongation of about 200% or greater.

In certain embodiments, a silane-terminated polyurethane reaction product is formed that has a tensile strength of about 4 MPa or greater. In other embodiments, the silane-terminated polyurethane reaction product has a tensile strength of about 8 MPa or greater. In yet other embodiments, the silane-terminated polyurethane reaction product has a tensile strength of about 10 MPa or greater.

In some embodiments, the silane-terminated polyurethane reaction product has an elongation at break of about 200% or greater. In other embodiments, the silane-terminated polyurethane reaction product has an elongation of about 250% or greater. In certain other embodiments, the silane-terminated polyurethane reaction product has an elongation of about 300% or greater.

The silane-terminated polyurethane reaction product exhibits a combination of high tensile strength and high elongation and is therefore suitable for high performance applications such as coatings, sealants, adhesives, and sports track binders.

Component polyols, diisocyanates, and silanes of the multicomponent formulations are selected from the same groups as described above with respect to the other embodiments. The silane-terminated polyurethane reaction products formed from the multicomponent formulations are suitable for use as coatings, sealants, adhesives, sports track binders and other high performance applications.

The described multicomponent formulations, silane-terminated polyurethane compositions, and silane-terminated polyurethane reaction products may comprise additional optional components which may include, but are not limited to, UV absorbers, antioxidants, stabilizers, mildewcides, biocides, fungicides, fire and flame retardants, fillers, pigments, plasticizers, solvents, catalysts, adhesion promoters, flow and leveling additives, wetting agents, antifoaming agents, rheology modifiers, and mixtures thereof. By way of example, but limitation, the reaction products may optionally contain up to about 5 percent by weight of UV absorbers, up to about 5 percent by weight of antioxidants, up to about 5 percent by weight of stabilizers, up to about 2 percent by weight of mildewcides, up to about 2 percent by weight of biocides, up to about 2 percent by weight of fungicides, up to about 20 percent by weight of fire or flame retardants, up to about 80 percent by weight of fillers, up to about 10 percent by weight of pigments, up to about 30 percent by weight of plasticizers, up to about 30 percent by weight of solvents, up to about 5 percent by weight of catalysts, up to about 5 percent by weight of adhesion promoters, up to about 10 percent by weight of flow and leveling additives, up to about 5 percent by weight of wetting agents, up to about 2 percent by weight of antifoaming agents, and/or up to about 20 percent by weight of rheology modifiers.

Suitable UV absorbers, stabilizers, antioxidants, mildewcides, biocides, and fungicides are materials known to those skilled in the art, and protect the multicomponent formulations, silane-terminated polyurethane compositions, and silane-terminated polyurethane reaction products from harmful effects of weathering and biological agents.

Suitable UV stabilizers may comprise 2-(2'-hydroxyphenyl)benzotriazoles, 2-hydroxybenzophenones, esters of substituted and unsubstituted benzoic acids, acrylates, nickel compounds, sterically hindered amines, oxanilides, 2-(2-hydroxyphenyl)-1,3,5-triazines, and mixtures thereof.

Representative examples of suitable UV stabilizers are set forth in U.S. patent application Ser. No. 10/797,548, filed Mar. 10, 2004, which is incorporated herein by reference.

Suitable antioxidants may comprise alkylated monophenols, alkylthiomethylphenols, hydroquinones and alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, benzylphosphonates, acylaminophenols, esters of beta-(3,5-di-tert-butyl-4-hydroxyphenyl)propionic acid with mono- or polyhydric alcohols, esters of beta-(5-tert-butyl-4-hydroxy-3-methylphenyl)propionic acid with mono- or polyhydric alcohols, esters of beta-(3,5-dicyclohexyl-4-hydroxyphenyl)propionic acid with mono- or polyhydric alcohols, esters of 3,5-di-tert-butyl-4-hydroxyphenyl acetic acid with mono- or polyhydric alcohols, amides of beta-(3,5-di-tert-butyl-4-hydroxyphenyl) propionic acid, ascorbic acid and derivatives, aminic antioxidants, and mixtures thereof.

Representative examples of suitable antioxidants are set forth in U.S. patent application Ser. No. 10/797,548, filed Mar. 10, 2004, which is incorporated herein by reference.

Suitable fungicides, mildewcides, and biocides may comprise 4,4-dimethyloxazolidine, 3,4,4-trimethyloxazolidine, modified barium metaborate, potassium N-hydroxy-methyl-N-methyldithiocarbamate, 2-(thiocyanomethylthio) benzothiazole, potassium dimethyl dithiocarbamate, adamantane, N-(trichloromethylthio) phthalimide, 2,4,5,6-tetrachloroisophthalonitrile, orthophenyl phenol, 2,4,5-trichlorophenol, dehydroacetic acid, copper naphthenate, copper octoate, organic arsenic, tributyl tin oxide, zinc naphthenate, copper 8-quinolinate, and mixtures thereof.

The fire retardants may comprise any material that provides self extinguishing properties. Suitable examples of the fire retardant include, but are not limited to, phosphates such as monoammonium phosphate, ammonium polyphosphate, melamine and melamine derivatives such as melamine phosphate, melamine cyanurate and melamine polyphosphate, triphenyl phosphate, tricresyl phosphate, tributyl phosphate, tri(2-chloroethyl)phosphate, dimethyl methyl phosphonate, zinc borate, expandable graphite, exfoliated graphite, acid treated natural graphite flakes, antimony/halogen systems and mixtures thereof. The fire retardant can be a liquid or a solid. A solid fire retardant may be ground to a micron size, typically referred to as micronized. Additionally, the fire retardant may include but is not limited to self extinguishing agents and flame retardants. In some embodiments, the fire retardant is ammonium polyphosphate. In other embodiments, an aluminum oxide smoke retardant is used in combination with the ammonium polyphosphate.

The multicomponent formulations, silane-terminated polyurethane compositions, and silane-terminated polyurethane reaction products may also comprise at least one filler, for example a solid inert to other materials in the compositions and reaction products. Resilient particles are useful fillers. Suitable examples of the filler include fibers, rubber particles, and cork particles. Other suitable examples of fillers include, but are not limited to carbon black, titanium dioxide, glass, such as crushed glass or glass spheres, metal such as iron particles, quartz, silica such as amorphous precipitated silica, hydrophilic fumed silicas, hydrophobic fumed silicas, kaolin, mica, diatomaceous earth, talc, zeolites, clays, aluminum hydroxide, sulfates such as aluminum sulfate, barium sulfate, and calcium sulfate, calcium carbonate, dolomite, organic and inorganic fibers, barytes, limestone, wollastonite, perlite, flint powder, kryolite, alumina, alumina trihydrate, polymer granules and powders such as granulated or micronized polyethylene and granulated or micronized polypropylene, melamine, fibers such as polypropylene or nylon, zinc oxide, and mixtures thereof. Carbon black and titanium dioxide may be used as both a filler and a pigment.

The multicomponent formulations, silane-terminated polyurethane compositions, and silane-terminated polyurethane reaction products may also comprise a coloring agent, such as a pigment or a dye, to provide a desired color to the sealant. Examples of coloring agents are carbon black and titanium dioxide which may be in the rutile form, but other coloring agents are also useful. Carbon black and titanium dioxide may act as both pigments and fillers in the sealant. Additional examples of pigments include, but are not limited to, barium sulfate, zinc oxide, zinc sulfide, basic lead carbonate, antimony trioxide, lithopones (zinc sulfide and barium sulfate), inorganic color pigments such as iron oxides, carbon black, graphite, luminescent pigments, zinc yellow, zinc green, ultramarine, manganese black, antimony black, manganese violet, Paris blue, and Schweinfurter green, organic color pigments such as sepia, gamboge, Cassel brown, toluidine red, para red, Hansa yellow, indigo, azo dyes, anthraquinonoid and indigoid dyes, as well as dioxazine, quinacridone, phthalocyanine, isoindolinone, and metal complex pigments, and mixtures thereof.

Suitable examples of plasticizers include, but are not limited to, phthalic acid esters such as dioctyl phthalate, diisononyl phthalate, di-isodecyl phthalate, butyl benzyl phthalate, and di-isobutyl phthalate, adipic acid esters such as dioctyl adipate and diisononyl adipate, sulfonic acid esters, and mixtures thereof.

Suitable examples of solvents include, but are not limited to, aliphatic hydrocarbons such as mineral spirits, aromatic hydrocarbons such as toluene, xylene, solvent naphtha, and Aromatic 100, esters such as ethyl acetate, butyl acetate, and propylene glycol diacetate, ethers such as dipropylene glycol dimethyl ether, ketones such as methyl ethyl ketone, methyl isobutyl ketone, and cyclohexanone, and mixtures thereof.

Suitable examples of catalysts include, but are not limited to, dibutyltin dilaurate, dibutyltin diacetate, stannous octoate, stannous octoate/laurylamine, dibutyltin bis(acetylacetonate), dibutyltin dichloride, dibutyltin bis(2-ethylhexyl mercaptoacetate), monobutyltin tris(2-ethylhexyl mercaptoacetate), butyltin trichloride, and combinations thereof.

The multicomponent formulations, polyurethane compositions, and polyurethane reaction products may additionally comprise surface additives such as flow and leveling additives, wetting agents, and antifoaming agents to facilitate application of the material. Examples of flow and leveling additives, wetting agents, and antifoaming agents include silicones, modified silicones, polyacrylates, and hydrocarbons such as petroleum components and mixtures. Examples of suitable flow additives include, but are not limited to, polyester modified acrylic functional poly-di-methyl siloxanes such as BYK®-371, and polyacrylate copolymers such as BYK®-358, (both available from BYK-Chemie USA, Wallingford, Conn.), and fluorosurfactants such as 3M™ Fluorad™ FC-4430 Fluorosurfactant (available from 3M Company, St. Paul, Minn.).

The multicomponent formulations, polyurethane compositions, and polyurethane reaction products may additionally comprise an adhesion promoter. Examples of adhesion promoters include, but are not limited to 3-aminopropyltrimethoxysilane, 3-aminopropyltriethoxysilane, 3-mercaptopropyltrimethoxysilane, 3-mercaptopropyltriethoxysilane, 1[3-(trimethoxysilyl)propyl]urea, 1-[3-(triethoxysilyl)propyl]urea, [3-(2-aminoethylamino)propyl]trimethoxysilane, [3-(2-aminoethylamino)propyl]triethoxysilane, 3-glycidyloxypropyl-trimethoxysilane, 3-glycidyloxypropyl-triethoxysilane, 2-(3,4-epoxycyclohexyl)ethyl-trimethoxysilane, 2-(3,4-epoxycyclohexyl)ethyl-triethoxysilane, 3-(phenylamino)propyl-trimethoxysilane, 3-(phenylamino)propyl-triethoxysilane, bis[3-(trimethoxysilyl)propyl]amine, bis[3-(triethoxysilyl)propyl]amine, 3-aminopropyl-methyldimethoxysilane, 3-aminopropyl-methyldiethoxysilane, 3-mercaptopropyl-methyldimethoxysilane, 3-mercaptopropyl-methyldiethoxysilane, [3-(2-aminoethylamino)propyl]methyldimethoxysilane, [3-(2-aminoethylamino)propyl]methyldiethoxysilane, 3-glycidoxypropyl methyldimethoxysilane, 3-glycidoxypropyl-methyldiethoxysilane, and combinations thereof.

The multicomponent formulations, silane-terminated polyurethane compositions, and silane-terminated polyurethane reaction products may also comprise a rheology modifier to increase the viscosity of the material immediately after application to a substrate. This can prevent the reaction products from dripping or running when initially applied to a substrate. Suitable examples of the rheology modifier include, but are not limited to, polyureas, fumed silica, hydroxyethyl cellulose, hydroxypropyl cellulose, polyamide waxes, modified castor oil, and clay intercalated with organic cations.

The additional components may be incorporated separately or may be combined with any reaction component.

In certain embodiments, the described multicomponent formulations, silane-terminated polyurethane compositions, and silane-terminated polyurethane reaction products may comprise binders that can bind and hold together fillers, aggregates, and other components in a polymer matrix. In other embodiments, the binders may also comprise coatings, sealants, adhesives, or other polymer matrices without any added fillers, aggregates, or other components.

The silane-terminated polyurethane composition may be made by a method comprising:

(a) providing a prepolymer component, a monomeric component, and optionally at least one multifunctional component, wherein the prepolymer component comprises a silane-terminated polyurethane prepolymer, the monomeric component comprises a silane-terminated monomeric diisocyanate, and the optional multifunctional component comprises at least one of a trisilane or tetrasilane component; and (b) combining the prepolymer component, the monomeric component, and optionally the at least one multifunctional component to form a silane-terminated polyurethane reaction product, wherein the reaction product has a tensile strength of about 4 MPa or greater and an elongation of about 200% or greater.

In certain embodiments, the silane-terminated reaction product has a tensile strength of about 4 MPa or greater. In other embodiments, the silane-terminated reaction product has a tensile strength of about 8 MPa or greater. In yet other embodiments, the silane-terminated reaction product has a tensile strength of about 10 MPa or greater. In some embodiments, the silane-terminated reaction product has an elongation at break of about 200% or greater. In other embodiments, the silane-terminated reaction product has an elongation of about 250% or greater. In certain other embodiments, the silane-terminated reaction product has an elongation of about 300% or greater.

In some embodiments, the silane-terminated polyurethane prepolymer component comprises an endcapped prepolymer reaction product of at least one diisocyanate and at least one polyol as described above. The silane-terminated monomeric diisocyanate comprises a monomeric diisocyanate fully reacted with an aminosilane or mercaptosilane endcapper as described above. The optional multifunctional component comprises at least one of a polyether trisilane component, a polyether tetrasilane component, or a low molecular weight silane adduct comprising at least one of a trisilane adduct or a tetrasilane adduct, as described above.

In certain embodiments, the silane-terminated polyurethane prepolymer component comprises a prepolymer reaction product of at least one diisocyanate and at least one polyol with a mole ratio of isocyanate groups to hydroxy groups of about 0.5:1 to about 0.9:1, wherein the prepolymer reaction product is further reacted with a monomeric diisocyanate, followed by termination with an aminosilane endcapper of the formula: R—NH—$A^1$—Si$(R^1)_x(OR^2)_{3-x}$, or a mercaptosilane endcapper of the formula: HS—$A^1$—Si$(R^1)_x(OR^2)_{3-x}$, wherein R represents a $C_1$ to $C_{10}$ alkyl group, a group having the formula —$A^1$—Si$(R^1)_x(OR^2)_{3-x}$, or a group having the formula —CH(COOR$^3$)—CH$_2$(COOR$^4$); $A^1$ represents a $C_1$ to $C_{10}$ linear, branched or cyclic alkylene group; $R^1$ represents a CH$_3$ or C$_2$H$_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

In certain other embodiments, the prepolymer component and monomeric component comprise a mixture of a silane-terminated polyurethane prepolymer and a silane-terminated monomeric diisocyanate, with the mixture comprising a reaction product of at least one diisocyanate and at least one polyol with a mole ratio of isocyanate groups to hydroxy groups of greater than about 2:1, wherein the reaction product is terminated with an aminosilane endcapper of the formula: R—NH—$A^1$—Si$(R^1)_x(OR^2)_{3-x}$, or a mercaptosilane endcapper of the formula: HS—$A^1$—Si$(R^1)_x(OR^2)_{3-x}$, wherein R represents a $C_1$ to $C_{10}$ alkyl group, a group having the formula —$A^1$—Si$(R^1)_x(OR^2)_{3-x}$, or a group having the formula —CH(COOR$^3$)—CH$_2$(COOR$^4$); $A^1$ represents a $C_1$ to $C_{10}$ linear, branched or cyclic alkylene group; $R^1$ represents a CH$_3$ or C$_2$H$_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

Polyurethane prepolymers are prepared by the reaction of a diisocyanate with a polyol. In some embodiments, a diisocyanate is reacted with a polyol at a temperature of about 60° C. or greater. In other embodiments, a diisocyanate is reacted with a polyol at a temperature of about 70° C. or greater. In yet other embodiments, a diisocyanate is reacted with a polyol at a temperature of about 80° C. or greater. In certain embodiments, the reaction time may be about 2 hours or greater. In other embodiments, the reaction time may be about 4 hours or greater. In yet other embodiments, the reaction time may be about 5 hours or greater.

The reaction of a diisocyanate with a polyol may be enhanced with the use of a catalyst. Suitable catalysts may include, but are not limited to, dialkyltin dicarboxylates such as dibutyltin dilaurate (DBTDL) and dibutyltin diacetate, tertiary amines, the stannous salts of carboxylic acids such as stannous octoate and stannous acetate, and combinations thereof. In certain embodiments, dibutyltin dilaurate is used as the catalyst for the reaction of a diisocyanate and a polyol.

In the preparation of a silane-terminated polyurethane prepolymer, the silane-containing compound used for the endcapping reaction may be chosen based on the mole ratio of isocyanate groups to hydroxy groups in the reaction mixture. For example, if the mole ratio of isocyanate groups to hydroxy groups is greater than about 1.0/1, an aminosilane or a mercaptosilane may be used for the endcapping reaction. If the mole ratio of isocyanate groups to hydroxy groups is less than about 1.0/1, an isocyanatosilane may be used for the endcapping reaction. In certain embodiments, the silane-containing compound is added slowly to a polyurethane prepolymer after reaction of the diisocyanate and polyol is complete. In some embodiments, the silane-containing compound is added slowly for about 30 minutes or more. In other embodiments, the silane-containing compound is added slowly for about 1 hour or more. The temperature may be kept unchanged during the addition of the silane-containing compound. The extent of completion of reaction may be monitored by Fourier Transform Infrared (FTIR) Spectroscopy through the disappearance of the isocyanate peak in the FTIR spectrum.

In certain embodiments, a mixture of a silane-terminated polyurethane prepolymer and a silane-terminated monomeric diisocyanate may be prepared through the aminosilane or mercaptosilane endcapping of a reaction product of a diisocyanate and a polyol with a mole ratio of isocyanate groups to hydroxy groups of greater than about 2:1. In other embodiments, a reaction product of at least one diisocyanate and at least one polyol with a mole ratio of isocyanate groups to hydroxy groups of less than about 2:1 is blended with additional monomeric diisocyanate to increase the mole ratio of isocyanate groups to hydroxy groups in the blend to greater than about 2:1. This mole ratio of greater than about 2:1 results in a polyurethane prepolymer reaction product that still contains free diisocyanate monomer. Endcapping with an aminosilane or a mercaptosilane results in the simultaneous preparation of a silane-terminated polyurethane prepolymer and a silane-terminated monomeric diisocyanate.

In some embodiments, prepolymer molecular weights may be increased by the use of a multi-step procedure comprising preparation of a prepolymer at a low mole ratio of isocyanate groups to hydroxy groups followed by blending of the formed prepolymer with additional monomeric diisocyanate to increase the mole ratio of isocyanate groups to hydroxy groups, with subsequent endcapping with an aminosilane or mercaptosilane. In certain embodiments, the mole ratio of isocyanate groups to hydroxy groups is less than about 2:1 before blending with additional monomeric diisocyanate and endcapping with an aminosilane or mercaptosilane.

The above reaction products may be applied to a substrate, such as the surface of concrete, asphalt, stone, rubber, plastic, metal, or wood by techniques known in the art, prior to the cure of the composition. In certain embodiments, the substrate may comprise composite materials, and in some embodiments the substrate may be in the form of a mat made from recycled rubber granules. Application techniques may include, but are not limited to, spraying, brushing, rolling, squeegeeing, scraping, troweling, and combinations thereof.

Improved performance is typically obtained for firm, clean, and dry load bearing substrate surfaces free of loose and brittle particles, and without substances which impair adhesion such as oil, grease, rubber skid marks, paint, or other contaminants. Surface preparation before application of the polyurethane composition as a coating, sealant, adhesive, or sports track binder can include water-blasting, sandblasting, cleaning, and drying, and the like.

A sports track binder is a representative high performance application with requirements that are met by the described silane-terminated polyurethane compositions and reaction products. Sports track binders are elastic materials that satisfy technical and environmental requirements for indoor and outdoor sports surfaces. These sports surfaces are designed for multipurpose use and offer high wear resistance as well as specific sports-related properties such as spike resistance. Sports track binders are used in sports halls, playgrounds, indoor arenas, and outdoor stadiums. Indoor sports halls include facilities for track, gymnastics, school sports, and multipurpose use. Outdoor applications include athletic tracks, tennis courts, and stadium warning tracks.

Requirements for sports track binders include strength and elasticity as indicated by high tensile strength and high elongation values. The described silane-terminated polyurethane compositions and reaction products exhibit high tensile strength and high elongation values and are suitable for use as sports track binders, coatings, adhesives, and sealants.

A sports track binder may comprise a single layer material. The described silane-terminated polyurethane compositions are suitable for use as single layer materials. A sports track binder may also comprise multiple layers, which may include a primer, a base mat, a pore sealer, a coating layer, a sealing layer, and line-painting. The described silane-terminated polyurethane compositions are suitable for use as any of these layers.

A coating layer may be applied in two or more coats. When applied to a substrate, in certain embodiments, a silane-terminated polyurethane composition is provided for a coating layer that is at least about 0.5 mm thick. In some embodiments, the silane-terminated polyurethane composition is about 0.5 mm to about 2 mm thick.

In certain embodiments, the bottom layer of a multiple layer construction utilizing the described polyurethane compositions comprises a rubber material. In some embodiments, a bottom layer comprising a prefabricated or cast in place mat has a thickness of about 1 cm, a coating layer applied in two coats has a thickness of about 0.5 mm to about 2 mm, and a sealing layer composition prepared using aliphatic diisocyanates has a thickness of up to about 100 mils.

The following specific examples are given to illustrate the preparation of silane-terminated polyurethane compositions and silane-terminated reaction products as discussed above.

EXAMPLES

| Screening Formulation | |
| --- | --- |
| silylated prepolymer(s) | 79.05 g |
| calcium carbonate filler | 3.00 g |
| fumed silica filler | 0.70 g |
| solvent | 17.17 g |
| DBTDL catalyst | 0.46 g |
| Total | 100.38 g |

Tensile Properties

Drawdowns of screening formulations were prepared with wet film thicknesses of 20 mils (about 0.5 mm) and cured for 7 days at standard conditions. Dumbbell specimens were cut from the cured films with a Die C and tested according to specification ASTM D 412 Test Method A (rate of elongation: 20 in./min, about 500 mm/min) on an INSTRON 5566 Universal Material Test System (Instron Corporation, Canton, Mass.).

General Procedure for Examples 1 and 2

A polyol and Mondur ML diisocyanate (mixture of 4,4'-diphenylmethane diisocyanate (MDI) and 2,4'-diphenylmethane diisocyanate) were blended in various NCO/OH ratios according to the following tables. DBTDL catalyst (0.02 parts) was added. The mixture was stirred with a propeller blade at 75 rpm and heated to 70° C. for 2-3 hours until the percent NCO reached the theoretical value. Then, the endcapper 3-ethylamino-2-methylpropyltrimethoxysilane (Silquest A-Link 15 from OSi Specialties) was added slowly through an addition funnel, while the temperature was kept at 70° C. Five to ten minutes after the end of the addition, the mixture was checked by FTIR for complete conversion and consequent disappearance of the NCO groups. Results are shown in Table 1 and Table 2.

Example 1

TABLE 1

| | Prepolymer | | | | |
| --- | --- | --- | --- | --- | --- |
| | 1 | 2 | 3 | 4 | 5 |
| Polyol | Voranol 220-028 | Voranol 220-028 | Voranol 220-028 | Voranol 220-028 | Voranol 220-028 |
| Molecular Weight | 4000 | 4000 | 4000 | 4000 | 4000 |
| NCO/OH ratio | 1.6 | 2.0 | 2.4 | 2.8 | 3.2 |
| Weight % Voranol 220-028 | 85.70 | 80.89 | 76.59 | 72.72 | 69.22 |
| Weight % Mondur ML | 8.57 | 10.11 | 11.49 | 12.73 | 13.85 |
| Weight % DBTDL | 0.02 | 0.02 | 0.02 | 0.02 | 0.02 |
| Weight % A-Link 15 | 5.71 | 8.98 | 11.90 | 14.53 | 16.91 |
| Prepolymer Viscosity At Ambient Temperature [mPas] | 56,800 | 45,000 | 39,200 | 38,400 | 34,000 |
| Mechanical Properties Of The Screening Formulation | | | | | |
| Tensile Strength [MPa] | 1.0 | 1.7 | 1.8 | 3.5 | 4.3 |
| Elongation [%] | 227 | 165 | 121 | 154 | 107 |

Example 2

TABLE 2

| | Prepolymer | | | |
| --- | --- | --- | --- | --- |
| | 6 | 4 | 7 | 8 |
| Polyol | Voranol 220-056N | Voranol 220-028 | Acclaim 8200 | Acclaim 12200 |
| Molecular Weight | 2000 | 4000 | 8000 | 12000 |
| NCO/OH ratio | 2.0 | 2.8 | 4.4 | 6.0 |
| Weight % Polyol | 67.92 | 72.72 | 75.39 | 76.32 |
| Weight % Mondur ML | 16.98 | 12.73 | 10.37 | 9.54 |
| Weight % DBTDL | 0.02 | 0.02 | 0.02 | 0.02 |
| Weight % A-Link 15 | 15.08 | 14.53 | 14.23 | 14.12 |
| Prepolymer Viscosity At Ambient Temperature [mPas] | 121,600 | 38,400 | 62,400 | 67,200 |
| Mechanical Properties Of The Screening Formulation | | | | |
| Tensile Strength [MPa] | 2.9 | 3.5 | 5.0 | 4.3 |
| Elongation [%] | 80 | 154 | 176 | 222 |

Example 3

Prepolymer 9

Corresponding to a first NCO/OH ratio of 1.50, 71.83 parts of Acclaim 8200 and 3.37 parts of Mondur ML diisocyanate were blended. DBTDL catalyst (0.02 parts) was added. The mixture was stirred with a propeller blade at 75 rpm and heated to 70° C. for two hours until the percent NCO reached the theoretical value of 0.50 percent. An additional amount of 8.21 parts of Mondur ML diisocyanate was added to attain a second NCO/OH ratio of 5.16. Then, 16.57 parts of the aminosilane endcapper Silquest A-Link 15 were added slowly through an addition funnel, while the temperature was kept at 70° C. Ten minutes after the end of the addition, the reaction was complete as confirmed by FTIR.

Properties:

Rheometer viscosity at 26° C.: 550,000 mPas

Tensile strength: 5.8 MPa

Elongation: 341%

Example 4

Prepolymer 10

Corresponding to a first NCO/OH ratio of 1.25, 69.82 parts of Acclaim 4200 and 5.45 parts of Mondur ML diisocyanate were blended. DBTDL catalyst (0.02 parts) was added. The mixture was stirred with a propeller blade at 75 rpm and heated to 70° C. for two hours until the percent NCO reached the theoretical value of 0.49 percent. An additional amount of 8.20 parts of Mondur ML diisocyanate was added to attain a second NCO/OH ratio of 3.13. Then, 16.50 parts of aminosilane endcapper Silquest A-Link 15 were added slowly through an addition funnel, while the temperature was kept at 70° C. Ten minutes after the end of the addition, the reaction was complete as confirmed by FTIR.

Properties:
Rheometer viscosity at 26° C.: 1,100,000 mPas
Tensile strength: 8.2 MPa
Elongation: 376%

Example 5

Formulation with Trisilane 1 (Polyether Trisilane)

Acclaim 6300 polyol (511.50 g), Silquest A-Link 35 isocyanatosilane (55.05 g), and DBTDL catalyst (0.611 g) were combined. The mixture was stirred with a propeller blade at 75 rpm and heated to 70° C. The percent NCO decrease to zero was monitored by FTIR. The reaction was complete after 1 hour.

| Tensile Properties Of Blends With Prepolymer 9: | | | | |
|---|---|---|---|---|
| | Weight percent Trisilane 1 | | | |
| | 0% | 5% | 10% | 15% | 20% |
| Tensile Strength [MPa] | 5.8 | 8.8 | 9.5 | 9.0 | 8.0 |
| Elongation [%] | 341 | 297 | 274 | 230 | 194 |

| Tensile Properties Of Blends With Prepolymer 10 | | | |
|---|---|---|---|
| | Weight percent Trisilane 1 | | |
| | 0% | 10% | 20% | 30% |
| Tensile Strength [MPa] | 8.2 | 11.3 | 7.8 | 7.5 |
| Elongation [%] | 376 | 295 | 185 | 172 |

Example 6

Formulation with Trisilane 2 (Low Molecular Weight Trisilane)

Aminosilane Silquest A-1170 bis-(gamma-trimethoxysilylpropyl)amine (56.2 g) was combined with Silquest A-187 gamma-glycidoxypropyltrimethoxysilane (38.9 g) and the mixture was heated in an oil bath at a temperature of 70° C. The reaction was monitored by GC/MS and proceeded very slowly. The mixture was heated to 85° C. for three more days while the heat was switched off overnight. After four days the conversion was 98+ percent complete. Yield: 93 g of a yellow liquid.

| Tensile Properties Of Blends With Prepolymer 9: | | | |
|---|---|---|---|
| | Weight percent Trisilane 2 | | |
| | 0% | 2.5% | 5% | 10% |
| Tensile Strength [MPa] | 5.8 | 8.4 | 10.1 | 9.8 |
| Elongation [%] | 341 | 287 | 297 | 249 |

| Tensile Properties Of Blends With Prepolymer 10: | | | |
|---|---|---|---|
| | Weight percent Trisilane 2 | | |
| | 0% | 2.5% | 5% | 10% |
| Tensile Strength [MPa] | 8.2 | 11.7 | 12.8 | 12.3 |
| Elongation [%] | 376 | 348 | 333 | 289 |

Example 7

Formulation with Trisilane 3 (Low Molecular Weight Trisilane)

Silquest A-Link 35 isocyanatosilane (23.8 g) was added to aminosilane Silquest A-1170 (40.8 g) in several small portions. The reaction was exothermic and the flask was cooled in a water bath. After complete addition the mixture was heated to 50° C. and the progress of the reaction was monitored by GC/MS until there was only a trace of A-Link 35 left. Yield: 63 g of a yellow liquid.

| Tensile Properties Of Blends With Prepolymer 10 | | |
|---|---|---|
| | Weight percent Trisilane 3 | |
| | 0% | 5% |
| Tensile Strength [MPa] | 5.8 | 9.3 |
| Elongation [%] | 341 | 303 |

Figure 2:
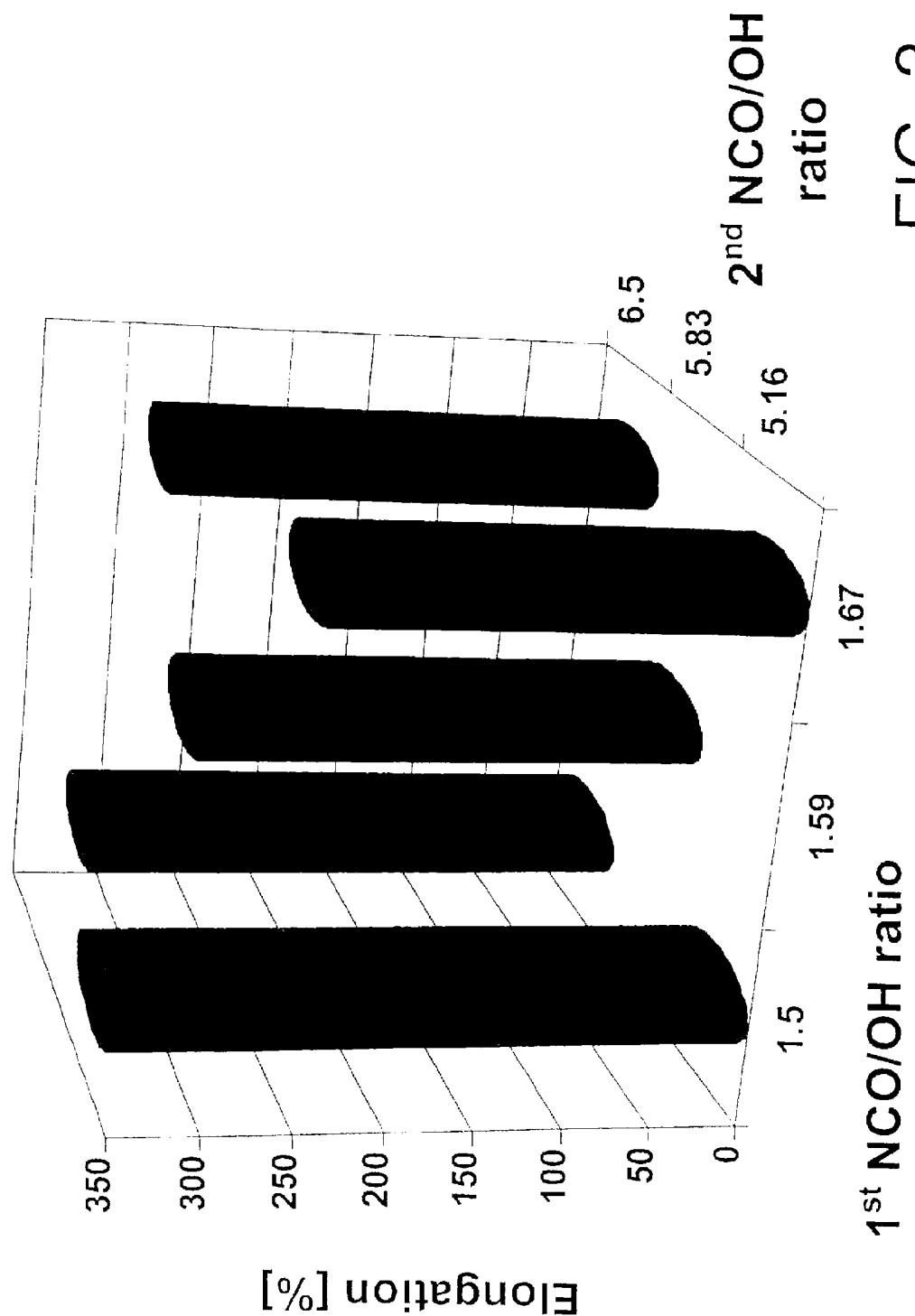
FIG. 2 is a three dimensional representation of elongation percentage of certain silane-terminated polyurethane reaction products synthesized from isocyanate terminated prepolymers of disocyanate and polyol having a ratio of isocyanate groups to hydroxy groups less than 2:1, blended with monomeric disocyanates to increase the ratio above 2:1.

As shown in FIGS. 1 and 2, synthesis of isocyanate terminated polyurethane prepolymers from disocyanate and polyol, exemplified by but not limited to a polyol having a molecular weight of about 8000, having a ratio of isocyanate groups to hydroxy groups (NCO/OH) less than 2:1, followed by blending with additional monomeric disocyanates to increase the NCO/OH ratio to above 2:1 and a silane endcapper such as an aminosilane, results in a reaction product having a tensile strength above 580 psi, that is, above 4 MPa, and percentage of elongation above 200%

Figure 3:
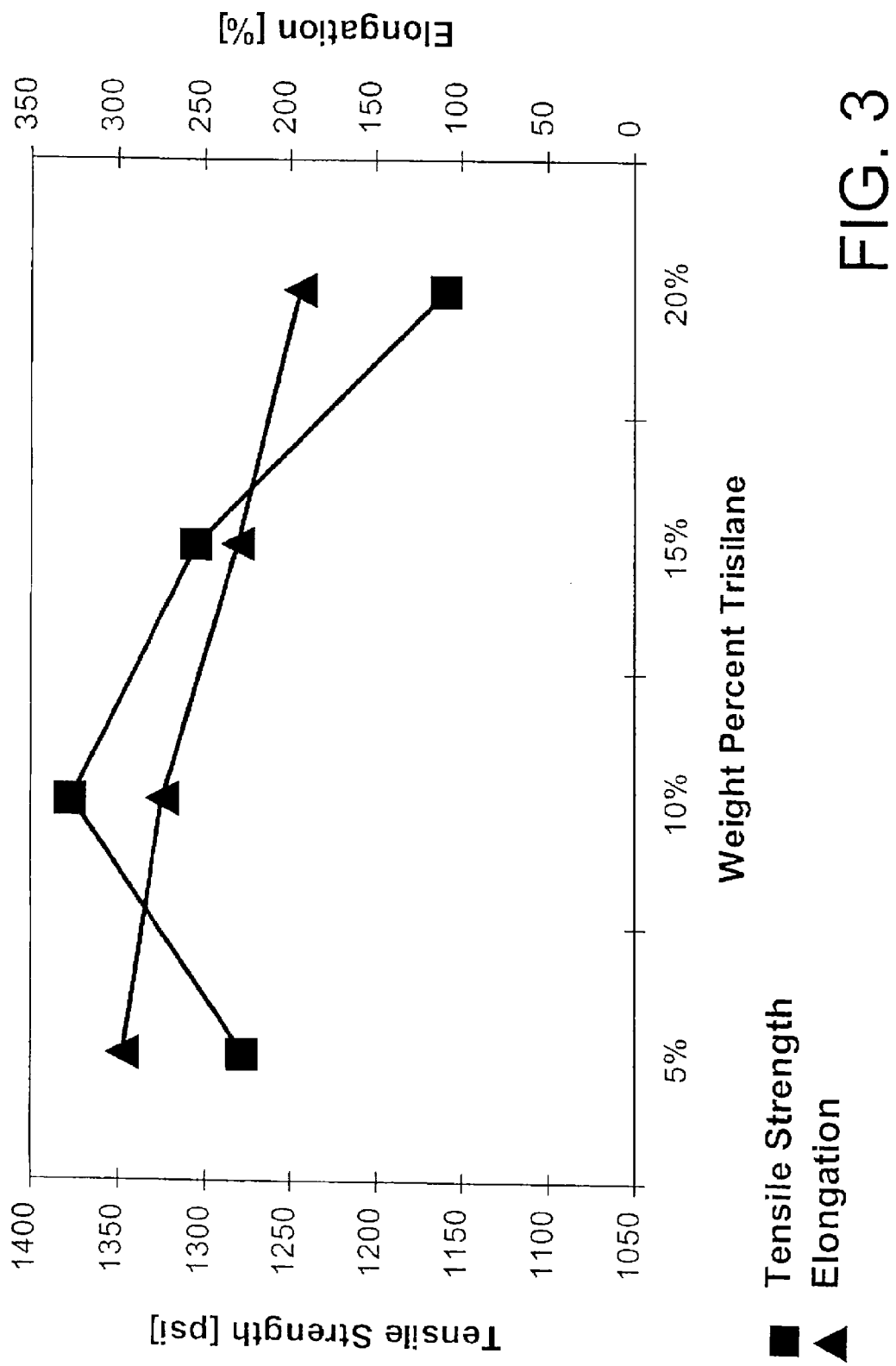
FIG. 3 is a graph showing the tensile strength and elongation percentage for a silane-terminated polyurethane reaction product according to certain embodiments as a function of the weight percentage of polyether trisilane component.
Figure 4:
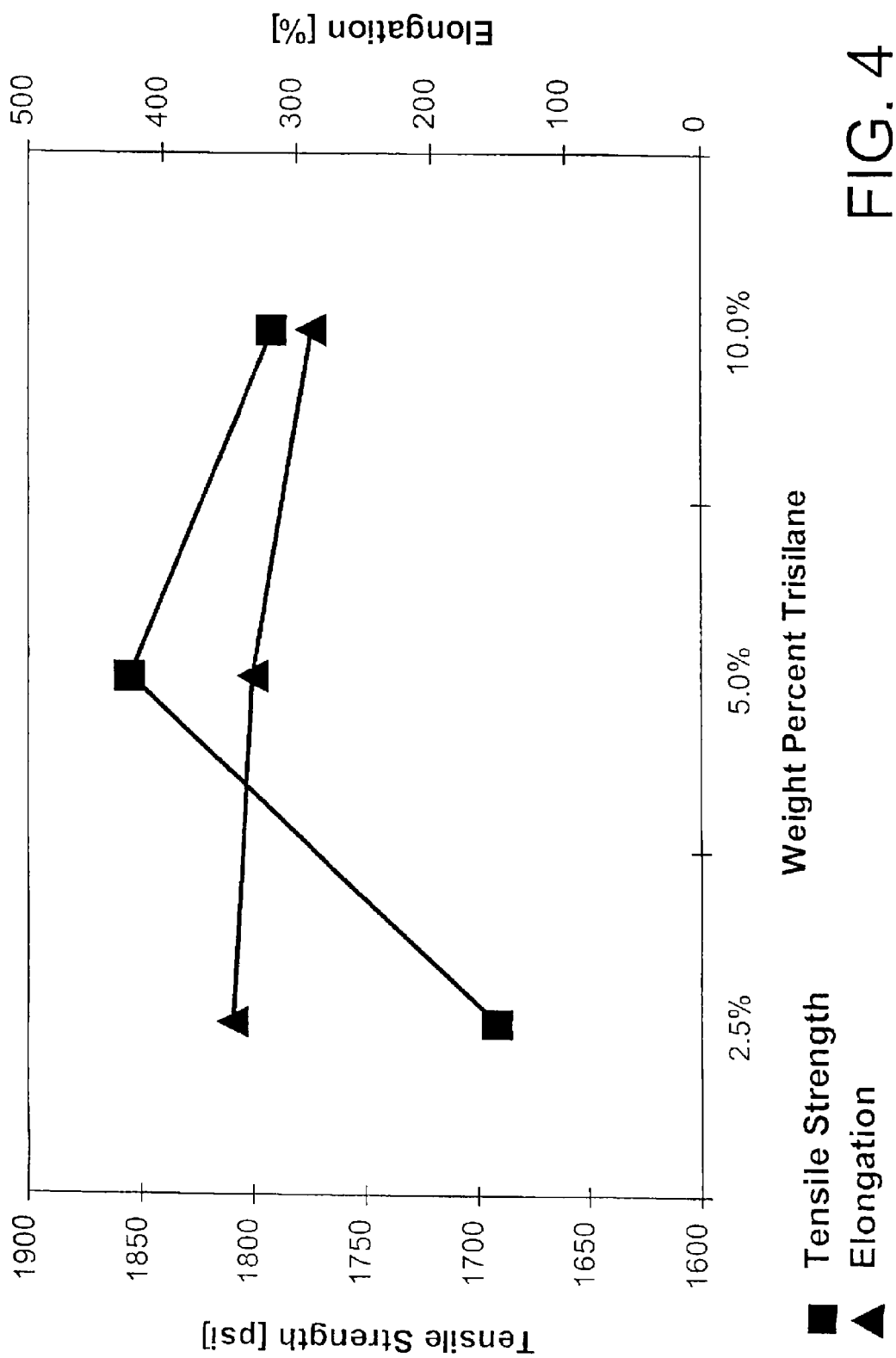
FIG. 4 is a graph showing the tensile strength and elongation percentage for a silane-terminated polyurethane reaction product according to certain embodiments as a function of the weight percentage of low molecular weight trisilane component.

As shown in FIGS. 3 and 4, synthesis of isocyanate terminated polyurethane prepolymers from disocyanate and polyol, exemplified by but not limited to a polyol having a molecular weight of about 8000, followed by blending with additional monomeric disocyanates, a silane endcapper, and a polyether trisilane or a low molecular weight trisilane, results in a reaction product having high tensile strength and high percentage of elongation.

The results shown in the above Tables and Figs. demonstrate high tensile strengths and high elongation values suitable for high performance applications such as coatings, sealants, adhesives, and compositions. Higher NCO/OH ratios result in higher tensile strengths. Increased molecular weight of the polyol component leads to improved elongation. Performance is improved further through the use of multifunctional trisilanes. Other benefits of the prepared materials include the absence of free isocyanates, the absence of bubbling during cure, improved adhesion, and better UV resistance and weatherability than unmodified polyurethanes.

In one embodiment a silane-terminated polyurethane composition may comprise the reaction product of:
a) a silane-terminated polyurethane prepolymer component;
b) a silane-terminated monomeric diisocyanate component; and
c) optionally a trisilane or tetrasilane component:
Preferably, wherein:
a) the silane-terminated polyurethane prepolymer component comprises at least one of:
i) a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

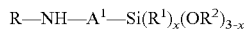
R—NH—A$^1$—Si(R$^1$)$_x$(OR$^2$)$_{3-x}$ or a mercaptosilane endcapper of the formula:

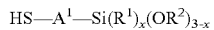
HS—A$^1$—Si(R$^1$)$_x$(OR$^2$)$_{3-x}$ wherein R represents a $C_1$ to $C_{10}$ alkyl group, a group having the formula —A$^1$—Si(R$^1$)$_x$(OR$^2$)$_{3-x}$, or a group having the formula —CH(COOR$^3$)—CH$_2$(COOR$^4$); A$^1$ represents a $C_1$ to $C_{10}$ linear, branched or cyclic alkylene group; R$^1$ represents a CH$_3$ or C$_2$H$_5$ group; R$^2$ represents a $C_1$ to $C_4$ alkyl group; R$^3$ represents a $C_1$ to $C_{13}$ alkyl group; R$^4$ represents a $C_1$ to $C_{13}$ alkyl group; and x is 0 or 1; or ii) a prepolymer reaction product of at least one diisocyanate and at least one polyol with a mole ratio of isocyanate groups to hydroxy groups of about 0.5:1 to about 0.9:1, said prepolymer reaction product terminated with an isocyanatosilane endcapper of the formula:

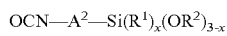
OCN—A$^2$—Si(R$^1$)$_x$(OR$^2$)$_{3-x}$ wherein A$^2$ represents a $C_1$ to $C_6$ linear or branched alkylene group; R$^1$ represents a CH$_3$ or C$_2$H$_5$ group; R$^2$ represents a $C_1$ to $C_4$ alkyl group; and x is 0 or 1;

b) the silane-terminated monomeric diisocyanate component comprises at least one monomeric diisocyanate fully reacted with an aminosilane endcapper of the formula:

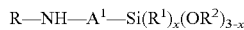
R—NH—A$^1$—Si(R$^1$)$_x$(OR$^2$)$_{3-x}$ or a mercaptosilane endcapper of the formula:

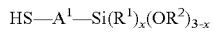
HS—A$^1$—Si(R$^1$)$_x$(OR$^2$)$_{3-x}$ wherein R represents a $C_1$ to $C_{10}$ alkyl group, a group having the formula —A$^1$—Si(R$^1$)$_x$(OR$^2$)$_{3-x}$, or a group having the formula —CH(COOR$^3$)—CH$_2$(COOR$^4$); A$^1$ represents a $C_1$ to $C_{10}$ linear, branched or cyclic alkylene group; R$^1$ represents a CH$_3$ or C$_2$H$_5$ group; R$^2$ represents a $C_1$ to $C_4$ alkyl group; R$^3$ represents a $C_1$ to $C_{13}$ alkyl group; R$^4$ represents a $C_1$ to $C_{13}$ alkyl group; and x is 0 or 1; and c) the optional trisilane or tetrasilane component comprises at least one of a polyether trisilane component, a polyether tetrasilane component, or a low molecular weight silane adduct comprising at least one of a trisilane adduct or a tetrasilane adduct.

In certain embodiments of the silane-terminated polyurethane composition:
A) the polyether trisilane component may comprise at least one of:
a) the reaction product of at least one polyether triol terminated with an isocyanatosilane endcapper of the formula:

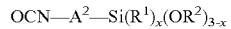
OCN—A$^2$—Si(R$^1$)$_x$(OR$^2$)$_{3-x}$ wherein A$^2$ represents a $C_1$ to $C_6$ linear or branched alkylene group; R$^1$ represents a CH$_3$ or C$_2$H$_5$ group; R$^2$ represents a $C_1$ to $C_4$ alkyl group; and x is 0 or 1; or b) the multifunctional reaction product of at least one polyether triol terminated with at least one diisocyanate with a mole ratio of isocyanate groups to hydroxy groups of about 1.5:1 to about 2:1, said multifunctional reaction product terminated with an aminosilane endcapper of the formula:

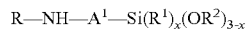
R—NH—A$^1$—Si(R$^1$)$_x$(OR$^2$)$_{3-x}$ or a mercaptosilane endcapper of the formula:

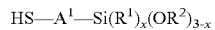
HS—A$^1$—Si(R$^1$)$_x$(OR$^2$)$_{3-x}$ wherein R represents a $C_1$ to $C_{10}$ alkyl group, a group having the formula —A$^1$—Si(R$^1$)$_x$(OR$^2$)$_{3-x}$, or a group having the formula —CH(COOR$^3$)—CH$_2$(COOR$^4$); A$^1$ represents a $C_1$ to $C_{10}$ linear, branched or cyclic alkylene group; R$^1$ represents a CH$_3$ or C$_2$H$_5$ group; R$^2$ represents a $C_1$ to $C_4$ alkyl group; R$^3$ represents a $C_1$ to $C_{13}$ alkyl group; R$^4$ represents a $C_1$ to $C_{13}$ alkyl group; and x is 0 or 1;

B) the polyether tetrasilane component may comprise at least one of:
a) the reaction product of at least one polyether tetraol terminated with an isocyanatosilane endcapper of the formula:

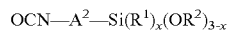
OCN—A$^2$—Si(R$^1$)$_x$(OR$^2$)$_{3-x}$ wherein A$^2$ represents a $C_1$ to $C_6$ linear or branched alkylene group; R$^1$ represents a CH$_3$ or C$_2$H$_5$ group; R$^2$ represents a $C_1$ to $C_4$ alkyl group; and x is 0 or 1; or b) the multifunctional reaction product of at least one polyether tetraol terminated with at least one diisocyanate with a mole ratio of isocyanate groups to hydroxy groups of about 1.5:1 to about 2:1, said multifunctional reaction product terminated with an aminosilane endcapper of the formula:

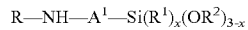
R—NH—A$^1$—Si(R$^1$)$_x$(OR$^2$)$_{3-x}$ or a mercaptosilane endcapper of the formula:

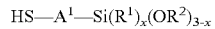
HS—A$^1$—Si(R$^1$)$_x$(OR$^2$)$_{3-x}$ wherein R represents a $C_1$ to $C_{10}$ alkyl group, a group having the formula —A$^1$—Si(R$^1$)$_x$(OR$^2$)$_{3-x}$, or a group having the formula —CH(COOR$^3$)—CH$_2$(COOR$^4$); A$^1$ represents a $C_1$ to $C_{10}$ linear, branched or cyclic alkylene group; R$^1$ represents a CH$_3$ or C$_2$H$_5$ group; R$^2$ represents a $C_1$ to $C_4$ alkyl group; R$^3$ represents a $C_1$ to $C_{13}$ alkyl group; R$^4$ represents a $C_1$ to $C_{13}$ alkyl group; and x is 0 or 1; and, C) the low molecular weight silane adduct may comprise the reaction product of at least one of:
a) i) at least one of HS—A$^1$—Si(R$^1$)$_x$(OR$^2$)$_{3-x}$, or R$^7$—NH—A$^1$—Si(R$^1$)$_x$(OR$^2$)$_{3-x}$ and ii) at least one of:

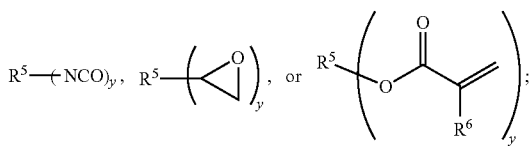

b) $R^5$—$(—OH)_y$, and OC—$A^2$-Si$(R^1)_x(OR^2)_{3-x}$:
c) i) at least one of:
$R^5$—$(—NHR^7)_y$, or
$[(R^2O)_{3-x}(R^1)_x Si—A^1—]_2 NH$, and
ii) at least one of:

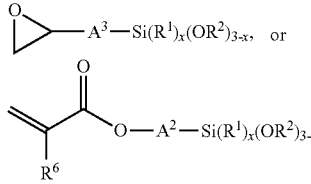

d) i) $[(R^2O)_{3-x}(R^1)_x Si—A^1—]_2 NH$, and
ii) a diisocyanate;
e) i) a polyether triamine and ii) at least one of:

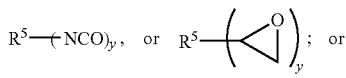

f) at least one of:
i) diethylenetriamine or triethylenetetramine, and ii) at least one of:

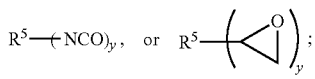

wherein $A^2$ represents a $C_1$ to $C_6$ linear, or branched alkylene group; $A^3$ represents a $C_1$ to $C_{10}$ linear, branched or cyclic alkylene group optionally interrupted with one or more ether oxygen atoms; $R^5$ represents a branched aliphatic hydrocarbon residue, a branched aliphatic ether residue, or an alkyl-substituted isocyanurate residue; $R^6$ represents H or a $CH_3$ group; $R^7$ represents H, a $C_1$ to $C_{10}$ alkyl group, a group having the formula —$A^1$—Si$(R^1)_x(OR^2)_{3-x}$, or a group having the formula —$CH(COOR^3)$—$CH_2$ $(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; x is 0 or 1; and y is 3 or 4.

In certain embodiments of the silane-terminated polyurethane composition, the at least one polyol may be selected from the group consisting of polyether polyols, polyester polyols, and combinations thereof; or from the group consisting of polypropylene glycols, polytetramethylene glycols, polyoxyalkylene diols and triols, polycaprolactone diols and triols, and combinations thereof; preferably wherein the at least one polyol has a number average molecular weight in the range of about 500 to about 20000.

In specific embodiments of the silane-terminated polyurethane composition, the at least one polyol may be selected from the group consisting of polyethylene glycols, polypropylene glycols, polytetramethylene glycols, polyethers prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, and mixtures of these polyols, and combinations selected from this group of glycols and polyethers; preferably wherein the at least one polyol has a number average molecular weight in the range of about 500 to about 20000.

In certain embodiments of the silane-terminated polyurethane composition, each diisocyanate may be selected from the group consisting of hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof.

In certain embodiments of the silane-terminated polyurethane composition, the aminosilane, if present, may be selected from the group consisting of secondary aminosilanes having two methoxy groups, secondary aminosilanes having three methoxy groups, secondary aminosilanes having two ethoxy groups, secondary aminosilanes having three ethoxy groups, and combinations thereof; wherein the mercaptosilane, if present, comprises (3-mercaptopropyl)trimethoxysilane; and, wherein the isocyanatosilane, if present, is selected from the group consisting of isocyanatosilanes having two methoxy groups, isocyanatosilanes having three methoxy groups, isocyanatosilanes having two ethoxy groups, isocyanatosilanes having three ethoxy groups, and combinations thereof.

In certain embodiments of the silane-terminated polyurethane composition, the reaction product additionally comprises at least one component selected from the group consisting of UV absorbers, antioxidants, stabilizers, mildewcides, biocides, fungicides, fire and flame retardants, fillers, pigments, plasticizers, solvents, catalysts, adhesion promoters, flow and leveling additives, wetting agents, antifoaming agents, rheology modifiers, and mixtures thereof.

In certain embodiments, the silane-terminated polyurethane composition may comprise a multicomponent formulation of a) the silane-terminated polyurethane prepolymer component; b) the silane-terminated monomeric diisocyanate component; and c) optionally the trisilane or tetrasilane component, each as described in any of the above embodiments, wherein when components a, b, and optionally c are combined, a silane-terminated polyurethane reaction product is formed that has a tensile strength of about 4 MPa or greater and an elongation of about 200% or greater.

A method for making the silane-terminated polyurethane composition comprises:
a) providing a prepolymer component, a monomeric component, and optionally at least one multifunctional component, wherein the prepolymer component comprises a silane-terminated polyurethane prepolymer, the monomeric component comprises a silane-terminated monomeric diisocyanate, and the optional multifunctional component comprises at least one of a trisilane or tetrasilane component; each according to any of the above embodiments, and b) combining the prepolymer component, monomeric component, and optionally at least one multifunctional component to form a silane-terminated polyurethane reaction product wherein the reaction product has a tensile strength of about 4 MPa or greater and an elongation of about 200% or greater.

The method may further comprise applying the reaction product to a substrate, preferably wherein said applying is selected from the group consisting of spraying, brushing, rolling, squeegeeing, scraping, troweling, and combinations thereof, and preferably wherein the substrate is selected from the group consisting of concrete, asphalt, stone, rubber, plastic, metal, and wood.

In the method wherein the prepolymer component comprises a silane-terminated polyurethane prepolymer component comprising a prepolymer reaction product of at least one diisocyanate and at least one polyol with a mole ratio of isocyanate groups to hydroxy groups of about 0.5:1 to about 0.9:1, said prepolymer reaction product may be further reacted with a monomeric diisocyanate, followed by termination with an aminosilane endcapper of the formula:

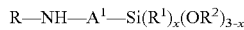

or a mercaptosilane endcapper of the formula:

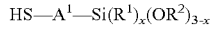

wherein R represents a $C_1$ to $C_{10}$ alkyl group, a group having the formula —$A^1$—$Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

In the method wherein the prepolymer component and monomeric component comprise a mixture of a silane-terminated polyurethane prepolymer and a silane-terminated monomeric diisocyanate, said mixture comprising at least one of:

a) a reaction product of at least one diisocyanate and at least one polyol with a mole ratio of isocyanate groups to hydroxy groups of greater than about 2:1, or b) a reaction product of at least one diisocyanate and at least one polyol with a mole ratio of isocyanate groups to hydroxy groups of less than about 2:1 blended with additional monomeric diisocyanate to increase the mole ratio of isocyanate groups to hydroxy groups in the blend to greater than about 2:1;

said reaction product is terminated with an aminosilane endcapper of the formula:

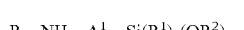

or a mercaptosilane endcapper of the formula:

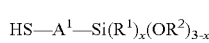

wherein R represents a $C_1$ to $C_{10}$ alkyl group, a group having the formula —$A^1$—$Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

In one embodiment of the method wherein the prepolymer component comprises a silane-terminated polyurethane prepolymer component comprising a prepolymer reaction product of at least one diisocyanate and at least one polyol with a mole ratio of isocyanate groups to hydroxy groups of about 0.5:1 to about 0.9:1, said prepolymer reaction product is terminated with an isocyanatosilane endcapper of the formula:

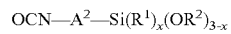

wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1; and the prepolymer component is blended for reaction with the silane-terminated monomeric diisocyanate component which comprises at least one monomeric diisocyanate fully reacted with an aminosilane endcapper or a mercaptosilane endcapper Although the invention has been described in detail through the above detailed description and the preceding examples, these examples are for the purpose of illustration only and it is understood that variations and modifications can be made by one skilled in the art without departing from the spirit and the scope of the invention. It should be understood that the embodiments described above are not only in the alternative, but can be combined.

What is claimed is:

1. A silane-terminated polyurethane composition comprising the reaction product of:

a) a silane-terminated polyurethane prepolymer component comprising at least one of:

a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

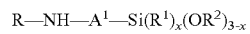

wherein R represents a $C_1$ to $C_{10}$ alkyl group, a group having the formula —$A^1$—$Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1;

b) a silane-terminated monomeric diisocyanate component comprising at least one monomeric diisocyanate fully reacted with an aminosilane endcapper of the formula:

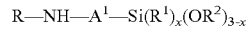

wherein R represents a $C_1$ to $C_{10}$ alkyl group, a group having the formula —$A^1$—$Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and c) optionally a trisilane or tetrasilane component comprising at least one of a polyether trisilane component, a polyether tetrasilane component, or a silane adduct comprising at least one of a trisilane adduct or a tetrasilane adduct;

wherein the reaction product has a tensile strength of about 4 MPa or greater and an elongation of about 200% or greater.

2. The silane-terminated polyurethane composition of claim 1, wherein the polyether trisilane component comprises at least one of:

a) the reaction product of at least one polyether triol terminated with an isocyanatosilane endcapper of the formula:

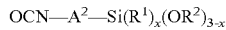

wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1; or b) the multifunctional reaction product of at least one polyether triol terminated with at least one diisocyanate with a mole ratio of isocyanate groups to hydroxy groups of about 1.5:1 to about 2:1, said multifunctional reaction product terminated with an aminosilane endcapper of the formula:

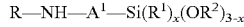

or a mercaptosilane endcapper of the formula:

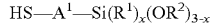

wherein R represents a $C_1$ to $C_{10}$ alkyl group, a group having the formula $—A^1—Si(R^1)_x(OR^2)_{3-x}$, or a group having the formula $—CH(COOR^3)—CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

3. The silane-terminated polyurethane composition of claim 1, wherein the polyether tetrasilane component comprises at least one of:

a) the reaction product of at least one polyether tetraol terminated with an isocyanatosilane endcapper of the formula:

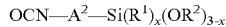

wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1; or b) the multifunctional reaction product of at least one polyether tetraol terminated with at least one diisocyanate with a mole ratio of isocyanate groups to hydroxy groups of about 1.5:1 to about 2:1, said multifunctional reaction product terminated with an aminosilane endcapper of the formula:

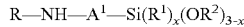

or a mercaptosilane endcapper of the formula:

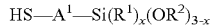

wherein R represents a $C_1$ to $C_{10}$ alkyl group, a group having the formula $—A^1—Si(R^1)_x(OR^2)_{3-x}$, or a group having the formula $—CH(COOR^3)—CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

4. The silane-terminated polyurethane composition of claim 1, wherein the silane adduct comprises the reaction product of at least one of:

a) i) at least one of $HS—A^1—Si(R^1)_x(OR^2)_{3-x}$, or $R^7—NH—A^1—Si(R^1)_x(OR^2)_{3-x}$ and ii) at least one of:

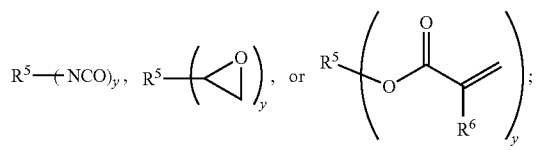

b) $R^5—(—OH)_y$ and $OCN—A^2—Si(R^1)_x(OR^2)_{3-x}$;

c) i) at least one of:
$R^5—(—NHR^7)_y$, or $[(R^2O)_{3-x}(R^1)_xSi—A^1—]_2NH$, and
ii) at least one of:

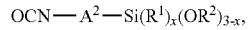

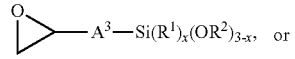

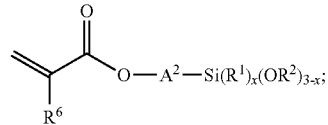

d) $[(R^2O)_{3-x}(R^1)_xSi—A^1—]_2NH$ and
ii) a diisocyanate;

e) i) a polyether triamine and ii) at least one of:

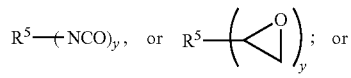

f) at least one of:
i) diethylenetriamine or triethylenetetramine, and ii) at least one of:

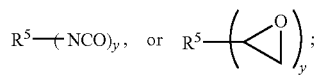

wherein $A^2$ represents a $C_1$ to $C_6$ linear, or branched alkylene group; $A^3$ represents a $C_1$ to $C_{10}$ linear, branched or cyclic alkylene group optionally interrupted with one or more ether oxygen atoms; $R^5$ represents a branched aliphatic hydrocarbon residue, a branched aliphatic ether residue, or an alkyl-substituted isocyanurate residue; $R^6$ represents H or a $CH_3$ group; $R^7$ represents H, a $C_1$ to $C_{10}$ alkyl group, a group having the formula $—A^1—Si(R^1)_x(OR^2)_{3-x}$, or a group having the formula $—CH(COOR^3)—CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; x is 0 or 1; and y is 3 or 4.

5. The silane-terminated polyurethane composition of claim 1, wherein the at least one polyol is selected from the group consisting of polyether polyols, polyester polyols, and combinations thereof.

6. The silane-terminated polyurethane composition of claim 1, wherein the at least one polyol is selected from the group consisting of polypropylene glycols, polytetramethylene glycols, polyoxyalkylene diols and triols, polycaprolactone diols and triols, and combinations thereof.

7. The silane-terminated polyurethane composition of claim 1, wherein the at least one polyol is selected from the group consisting of polyethylene glycols, polypropylene glycols, polytetramethylene glycols, polyethers prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, and mixtures of these polyols, and combinations selected from this group of glycols and polyethers.

8. The silane-terminated polyurethane composition of claim 1, wherein each diisocyanate is selected from the group consisting of hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof.

9. The silane-terminated polyurethane composition of claim 1, wherein each diisocyanate comprises a blend of 4,4'-diphenylmethane diisocyanate (MDI) with 2,4'-diphenylmethane diisocyanate.

10. The silane-terminated polyurethane composition of claim 1, wherein the aminosilane is selected from the group consisting of secondary aminosilanes having two methoxy groups, secondary aminosilanes having three methoxy groups, secondary aminosilanes having two ethoxy groups, secondary aminosilanes having three ethoxy groups, and combinations thereof.

11. The silane-terminated polyurethane composition of claim 1, wherein the aminosilane is selected from the group consisting of bis(trimethoxysilylpropyl)amine, 3-ethylamino-2-methylpropyltrimethoxysilane, N-(n-butyl)-3-aminopropyltrimethoxysilane, and combinations thereof.

12. The silane-terminated polyurethane composition of claim 1, wherein the at least one polyol has a number average molecular weight in the range of about 500 to about 20000.

13. The silane-terminated polyurethane composition of claim 1, wherein the at least one polyol comprises a polypropylene glycol with a number average molecular weight in the range of about 4000 to about 12000, and wherein said polypropylene glycol has a degree of unsaturation of less than about 0.04 meq/g.

14. A multicomponent formulation comprising:
a) at least one of
a silane-terminated polyurethane prepolymer component comprising a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

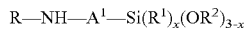

wherein R represents a $C_1$ to $C_{10}$ alkyl group, a group having the formula —$A^1Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; or b) at least one monomeric diisocyanate fully reacted with an aminosilane endcapper of the formula:

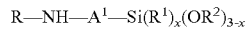

wherein R represents a $C_1$ to $C_{10}$ alkyl group, a group having the formula —$A^1$13 $Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and c) optionally at least one of a polyether trisilane component, a polyether tetrasilane component, or a silane adduct comprising at least one of a trisilane adduct or a tetrasilane adduct;

wherein when components a, b, and optionally c are reacted, a silane-terminated polyurethane reaction product is formed that has a tensile strength of about 4 MPa or greater and an elongation of about 200% or greater.

15. The multicomponent formulation of claim 14, wherein the polyether trisilane component comprises at least one of:
a) the reaction product of at least one polyether triol terminated with an isocyanatosilane endcapper of the formula:

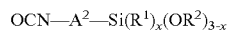

wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1; or b) the multifunctional reaction product of at least one polyether triol terminated with at least one diisocyanate with a mole ratio of isocyanate groups to hydroxy groups of about 1.5:1 to about 2:1, said multifunctional reaction product terminated with an aminosilane endcapper of the formula:

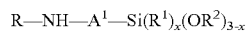

or a mercaptosilane endcapper of the formula:

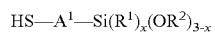

wherein R represents a $C_1$ to $C_{10}$ alkyl group, a group having the formula —$A^1$—$Si(R^1)_x(OR^2)_{3-x}$, or a group having the formula —$CH(COOR^3)$—$CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

16. The multicomponent formulation of claim 14, wherein the polyether tetrasilane component comprises at least one of:
a) the reaction product of at least one polyether tetraol terminated with an isocyanatosilane endcapper of the formula:

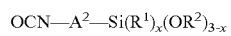

wherein $A^2$ represents a $C_1$ to $C_6$ linear or branched alkylene group; $R^1$ represents a $CH_3$ or $C_2H_5$ group; $R^2$ represents a $C_1$ to $C_4$ alkyl group; and x is 0 or 1; or b) the multifunctional reaction product of at least one polyether tetraol terminated with at least one diisocyanate with a mole ratio of isocyanate groups to hydroxy groups of about 1.5:1 to about 2:1, said multifunctional reaction product terminated with an aminosilane endcapper of the formula:

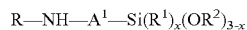

or a mercaptosilane endcapper of the formula:

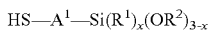

wherein R represents a $C_1$ to $C_{10}$ alkyl group, a group having the formula $—A^1—Si(R^1)_x(OR^2)_{3-x}$, or a group having the formula $—CH(COOR^3)—CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1.

17. The multicomponent formulation of claim 14, wherein the silane adduct comprises the reaction product of at least one of:
   a) i) at least one of $HS—A^1—Si(R^1)_x(OR^2)_{3-x}$, or $R^7—NH—A^1—Si(R^1)_x(OR^2)_{3-x}$ and
      ii) at least one of:

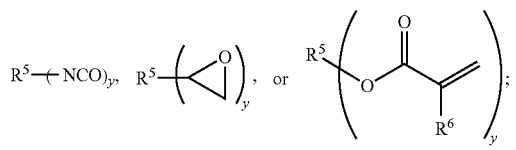

b) $R^5—(—OH)_y$, and $OCN—A^2—Si(R^1)_x(OR^2)_{3-x}$;
   c) at least one of:
      i) $R^5—(NHR^7)_y$, or $[(R^2O)_{3-x}(R^1)_xSi—A^1—]_2NH$, and
      ii) at least one of:

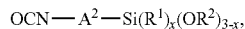

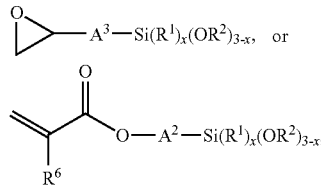

d) i) $[(R^2O)_{3-x}(R^1)_xSi—A^1—]_2NH$ and
      ii) a diisocyanate;
   e) i) a polyether triamine and ii) at least one of:

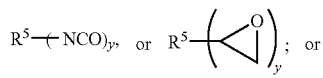

f) at least one of:
      i) diethylenetriamine or triethylenetetramine, and ii) at least one of:

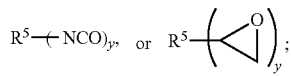

wherein $A^2$ represents a $C_1$ to $C_6$ linear, or branched alkylene group; $A^3$ represents a $C_1$ to $C_{10}$ linear, branched or cyclic alkylene group optionally interrupted with one or more ether oxygen atoms; $R^5$ represents a branched aliphatic hydrocarbon residue, a branched aliphatic ether residue, or an alkyl-substituted isocyanurate residue; $R^6$ represents H or a $CH_3$ group; $R^7$ represents H, a $C_1$ to $C_{10}$ alkyl group, a group having the formula $—A^1—Si(R^1)_x(OR^2)_{3-x}$, or a group having the formula $—CH(COOR^3)—CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; x is 0 or 1; and y is 3 or 4.

18. The multicomponent formulation of claim 14, wherein the at least one polyol is selected from the group consisting of polyether polyols, polyester polyols, and combinations thereof.

19. The multicomponent formulation of claim 14, wherein the at least one polyol is selected from the group consisting of polypropylene glycols, polytetramethylene glycols, polyoxyalkylene diols and triols, polycaprolactone diols and triols, and combinations thereof.

20. The multicomponent formulation of claim 14, wherein the at least one polyol is selected from the group consisting of polyethylene glycols, polypropylene glycols, polytetramethylene glycols, polyethers prepared by the copolymerization of cyclic ethers selected from the group consisting of ethylene oxide, propylene oxide, trimethylene oxide, tetrahydrofuran, and mixtures of these cyclic ethers, with aliphatic polyols selected from the group consisting of ethylene glycol, 1,3-butanediol, diethylene glycol, dipropylene glycol, 1,2-propylene glycol, 1,3-propylene glycol, 1,4-butylene glycol, and mixtures of these polyols, and combinations selected from this group of glycols and polyethers.

21. The multicomponent formulation of claim 14, wherein each diisocyanate is selected from the group consisting of hexamethylene diisocyanate (HDI), 4,4'-diphenylmethane diisocyanate (MDI), 2,4'-diphenylmethane diisocyanate, blends of 4,4'-diphenylmethane diisocyanate (MDI) with 2,4'-diphenylmethane diisocyanate, 2,4-toluene diisocyanate (TDI), 2,6-toluene diisocyanate, blends of 2,4-toluene diisocyanate (TDI) with 2,6-toluene diisocyanate, 1-isocyanato-3,3,5-trimethyl-5-isocyanatomethylcyclohexane (IPDI), dicyclohexylmethane-4,4'-diisocyanate, and combinations thereof.

22. The multicomponent formulation of claim 14, wherein each diisocyanate comprises a blend of 4,4'-diphenylmethane diisocyanate (MDI) with 2,4'-diphenylmethane diisocyanate.

23. The multicomponent formulation of claim 14, wherein the aminosilane is selected from the group consisting of secondary aminosilanes having two methoxy groups, secondary aminosilanes having three methoxy groups, secondary aminosilanes having two ethoxy groups, secondary aminosilanes having three ethoxy groups, and combinations thereof.

24. The multicomponent formulation of claim 14, wherein the aminosilane is selected from the group consisting of bis(trimethoxysilylpropyl)amine, 3-ethylamino-2-methylpropyltrimethoxysilane, N-(n-butyl)-3-aminopropyltrimethoxysilane, and combinations thereof.

25. The multicomponent formulation of claim 14, wherein the at least one polyol has a number average molecular weight in the range of about 500 to about 20000.

26. The multicomponent formulation of claim 14, wherein the at least one polyol comprises a polypropylene glycol with a number average molecular weight in the range of about 4000 to about 12000, and wherein said polypropylene glycol has a degree of unsaturation of less than about 0.04 meq/g.

27. The multicomponent formulation of claim 14, wherein the reaction product has a tensile strength of about 10 MPa or greater.

28. The multicomponent formulation of claim 14, wherein the reaction product has an elongation of about 300% or greater.

29. A multicomponent formulation comprising:
   a) at least one of:
      a silane-terminated polyurethane prepolymer component comprising a prepolymer reaction product of at least one diisocyanate and at least one polyol with a mole ratio of isocyanate groups to hydroxy groups of about 1.1:1 to about 2:1, said prepolymer reaction product terminated with an aminosilane endcapper of the formula:

$$R-NH-A^1-Si(R^1)_x(OR^2)_{3-x}$$

wherein R represents a $C_1$ to $C_{10}$ alkyl group, a group having the formula $-A^1-Si(R^1)_x(OR^2)_{3-x}$, or a group having the formula $-CH(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; or
   b) at least one monomeric diisocyanate component selected from the group consisting of 4,4'-diphenylmethane diisocyanate, 2,4'-diphenylmethane diisocyanate, blends of 4,4'-diphenylmethane diisocyanate with 2,4'-diphenylmethane diisocyanate, 2,4-toluene diisocyanate, 2,6-toluene diisocyanate, blends of 2,4-toluene diisocyanate with 2,6-toluene diisocyanate, 1-isocyanato-3,3,5-trimethyl-5-isocyanatomethylcyclohexane, dicyclohexylmethane-4,4'-diisocyanate, and combinations thereof, the at least one monomeric diisocyanate fully reacted with an aminosilane endcapper of the formula:

$$R-NH-A^1-Si(R^1)_x(OR^2)_{3-x}$$

wherein R represents a $C_1$ to $C_{10}$ alkyl group, a group having the formula $-A^1-Si(R^1)_x(OR^2)_{3-x}$, or a group having the formula $-CH(COOR^3)-CH_2(COOR^4)$; $A^1$ represents a $C_1$ to $C_{10}$ linear, branched or cyclic alkylene group; $R^1$ represents a $CH_3$ or $C_2H_5$ group; $R^2$ represents a $C_1$ to $C_4$ alkyl group; $R^3$ represents a $C_1$ to $C_{13}$ alkyl group; $R^4$ represents a $C_1$ to $C_{13}$ alkyl group; and x is 0 or 1; and
   c) optionally at least one of a polyether trisilane component, a polyether tetrasilane component, or a silane adduct component comprising at least one of a trisilane adduct or a tetrasilane adduct;

wherein when components a, b, and optionally c are reacted, a silane-terminated polyurethane reaction product is formed that has a tensile strength of about 4 MPa or greater and an elongation of about 200% or greater.

30. The multicomponent formulation of claim 29, wherein the diisocyanate of the prepolymer reaction product component and the monomeric diisocyanate component comprise a blend of 4,4'-diphenylmethane diisocyanate with 2,4'-diphenylmethane diisocyanate.

* * * * *